United States Patent
Delson

(10) Patent No.: US 11,436,028 B2
(45) Date of Patent: Sep. 6, 2022

(54) SYSTEMS AND METHODS FOR AUTOMATED REAL-TIME SELECTION AND DISPLAY OF GUIDANCE ELEMENTS IN COMPUTER IMPLEMENTED SKETCH TRAINING ENVIRONMENTS

(71) Applicant: eGrove Education, Inc., San Diego, CA (US)

(72) Inventor: Nathan Delson, San Diego, CA (US)

(73) Assignee: eGrove Education, Inc., San Diego, CA (US)

(*) Notice: Subject to any disclaimer, the term of this patent is extended or adjusted under 35 U.S.C. 154(b) by 0 days.

(21) Appl. No.: 16/901,962

(22) Filed: Jun. 15, 2020

(65) Prior Publication Data
US 2020/0394058 A1 Dec. 17, 2020

Related U.S. Application Data

(60) Provisional application No. 62/861,695, filed on Jun. 14, 2019.

(51) Int. Cl.
*G06F 17/00* (2019.01)
*G06F 9/451* (2018.01)
*G09B 11/00* (2006.01)
*G06K 9/62* (2022.01)
*G06F 3/04845* (2022.01)

(52) U.S. Cl.
CPC .......... *G06F 9/453* (2018.02); *G06F 3/04845* (2013.01); *G06K 9/6215* (2013.01); *G09B 11/00* (2013.01)

(58) Field of Classification Search
CPC .... G06F 9/453; G06F 3/0445; G06F 3/04845; G09B 11/00; G09B 7/04; G06K 9/6253; G06K 9/033; G06K 9/6215; G06V 10/987
See application file for complete search history.

(56) References Cited

U.S. PATENT DOCUMENTS

| | | | | |
|---|---|---|---|---|
| 10,867,562 | B2 * | 12/2020 | Rossol | G02F 1/133602 |
| 2009/0068625 | A1 * | 3/2009 | Petro | G09B 1/00 434/160 |
| 2011/0065082 | A1 * | 3/2011 | Gal | G09B 7/02 434/365 |
| 2012/0060102 | A1 * | 3/2012 | Shohfi | G06F 3/0482 715/752 |
| 2014/0045148 | A1 * | 2/2014 | Ishiyama | G09B 11/10 434/85 |

(Continued)

OTHER PUBLICATIONS

Choi, Jungwoo, et al, "SketchHelper: Real-Time Stroke Guidance for Freehand Sketch Retrieval", IEEE Transactions on Multimedia (vol. 21, Issue 8), Jan. 9, 2019, pp. 2083-2092. (Year: 2019).*

*Primary Examiner* — Laurie A Ries
(74) *Attorney, Agent, or Firm* — Veros Legal Solutions, LLP

(57) ABSTRACT

In a computer implemented sketch-based education or training system, guidance elements are generated and output to users both on an affirmative request of the user and in an automated manner without a request for guidance from the user. Automated guidance may take the form of a mini-hint that does not provide explicit information about a solution. The automatically provided guidance elements may contain numerical measures of correspondence between a user submitted sketch and a model sketch.

12 Claims, 17 Drawing Sheets

(56) References Cited

U.S. PATENT DOCUMENTS

| | | | |
|---|---|---|---|
| 2014/0108016 A1* | 4/2014 | Albrecht | G01C 21/34 704/270 |
| 2014/0270489 A1* | 9/2014 | Lim | G06K 9/4604 382/159 |
| 2020/0175889 A1* | 6/2020 | Delson | G09B 11/00 |

* cited by examiner

| Guidance Hierarchy | Number of Times Guidance Can be Repeated | Guidance Trigger | Guidance Element Content |
|---|---|---|---|
| 1 | 2 | Magnitude of connected region of incorrect image component | You may have an additional a line |
| 2 | Infinite | Comparison to predifed mistake | Lines should only be drawn on the edges of flat surfaces. |
| 3 | 4 | Magnitude of dashes and gaps in region of dashed lines in solution | Check dashed lines |
| 4 | Infinite | Region of Evaluation of Front View | Check for errors in the Front View |
| 5 | Infinite | Any Incorrect Sketch | Try Again |

FIG. 14

SYSTEMS AND METHODS FOR AUTOMATED REAL-TIME SELECTION AND DISPLAY OF GUIDANCE ELEMENTS IN COMPUTER IMPLEMENTED SKETCH TRAINING ENVIRONMENTS

RELATED APPLICATIONS

This application claims priority to U.S. Provisional Application 62/861,695 filed on Jun. 14, 2019. The entire disclosures of all the related applications set forth in this section are hereby incorporated by reference in their entireties.

BACKGROUND

Computer implemented instruction and education is becoming more prevalent. Instead of just reading or listening via computer interface, methods of providing interactive content have been developed. This has been a significant challenge in designing computer implemented systems for effective delivery and instruction.

It should be noted that this Background is not intended to be an aid in determining the scope of the claimed subject matter nor be viewed as limiting the claimed subject matter to implementations that solve any or all the disadvantages or problems presented above. The discussion of any technology, documents, or references in this Background section should not be interpreted as an admission that the material described is prior art to any of the subject matter claimed herein.

SUMMARY

In one implementation a method of providing guidance to a user of a computer implemented educational system, the method comprising receiving user input via a computer sketch input interface, the user input defining a first computer sketch, comparing the first computer sketch to a model computer sketch, calculating a magnitude of one or more differences and/or similarities between the first computer sketch and the model computer sketch and assigning a fail status to the first computer sketch based at least in part on the calculating. In response to the fail status, a guidance element may be automatically presented to the user.

It is understood that various configurations of the subject technology will become apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

Various embodiments are discussed in detail in conjunction with the Figures described below, with an emphasis on highlighting the advantageous features. These embodiments are for illustrative purposes only and any scale that may be illustrated therein does not limit the scope of the technology disclosed. These drawings include the following figures, in which like numerals indicate like parts.

FIG. 14 shows a table of guidance display output hierarchy.

DETAILED DESCRIPTION

Figure 1:
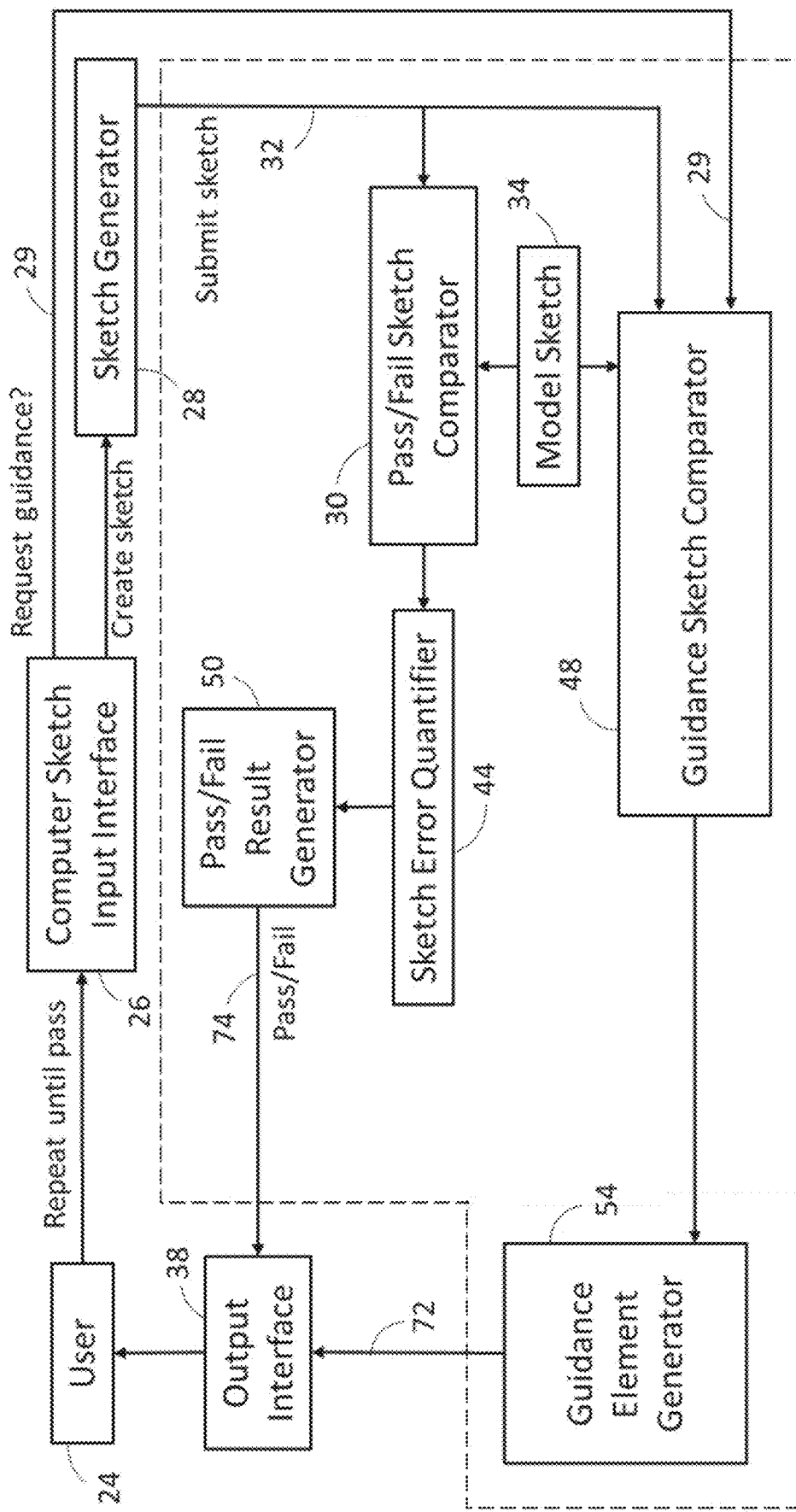
FIG. 1 is a functional block diagram of a system for sketch training including guidance requests.

The following description and examples illustrate some exemplary implementations, embodiments, and arrangements of the disclosed invention in detail. Those of skill in the art will recognize that there are numerous variations and modifications of this invention that are encompassed by its scope. Accordingly, the description of a certain example embodiment should not be deemed to limit the scope of the present invention.

Definitions

Processor: A processor is an electronic circuit configured to retrieve instructions from a memory and execute one or more arithmetic, logic, data storage, and/or data output operations defined by each instruction. A processor may execute these operations sequentially or concurrently. A processor may be any conventional general-purpose single- or multi-chip processor found in consumer devices such as personal computers, laptop computers, smartphones, and the like. In addition, a processor may be any conventional special purpose processor such as a digital signal processor, a graphics processor, or a microcontroller. The term processor further encompasses two or more individual electronic circuit processor that share information and/or tasks, whether they are in the same or different systems.

Software and Software Program: The terms software and software program refer to instructions stored in a memory in machine-readable form, human-readable form, or both that are executable by a processor when compiled into a machine-readable form. Software may be written in a variety of programming languages such as but not limited to the various versions of C and JavaScript. Software may be stored in compiled or uncompiled form. Depending on the environment of use, software may be also called firmware.

Algorithm: A connected sequence of two or more acts of data manipulation. Software programs are implementations of algorithms.

Browser and Web Page: A browser is a computer program that provides functionality to a computer for executing syntax that may be contained in web pages. The computer may be connected to a computer network, and the network may be, and usually will be, the Internet. As used herein, browsers and web pages together provide functionality to a computer connected to a network (e.g. the Internet) at least sufficient to request, retrieve, and display at least some network resources including web pages themselves, and to execute at least some links contained within or referred to in retrieved web pages to retrieve other web pages specified with the links. Web pages may include references such as uniform resource locators (URLs) and/or universal resource identifiers (URIs) to other network resources that contain images or other data that is retrieved by the browser from the network or from a cache memory when executing the web page, and may also include and/or reference programs, libraries, style sheets, scripts, and the like which are run by the browser when executing a web page. Any of these items that are accessed, used, and/or retrieved during browser engine execution of web page syntax are considered to be included as a component of the "web page" as that term is used herein. Examples of browsers include, but are not limited to, Internet Explorer and Edge distributed by Microsoft, and Chrome distributed by Google. Example web page syntax that can be executed by browser engines is the various versions of HyperText Markup Language (HTML) promulgated by the World Wide Web Consortium (W3C) and client-side scripting languages such as JavaScript.

Server: The term server refers to a software program that is configured to cause computer hardware to respond to client access requests to use or retrieve network resources. In some cases, the term server refers to computer hardware that is either executing server software or is intended to execute server software.

Web Server: A server that includes functionality for responding to requests issued by browsers to a network, including, for example, requests to receive network resources such as web pages. Currently, browsers and web servers format their requests and responses thereto in accordance with the HyperText Transfer Protocol (HTTP) promulgated by the IETF and W3C.

Internet: The globally interconnected system of computers and computer networks that evolved from ARPANET and NSFNET over the late 1980s and early 1990s that may utilize TCP/IP network communication protocols.

Cloud Services: A collection of network resources configured to support the operation of one or more software programs executing on one or more user devices such as desktop computers, laptop computers, and smartphones. The software that accesses and utilizes the cloud services is often written in a platform-independent language such as Java that is executed by a browser.

Web Site: A collection of network resources including at least some web pages that share a common network resource identifier portion, such as a set of web pages with URLs sharing a common domain name but different pathnames.

World Wide Web: The collection of web pages stored by and accessible to computers running browsers connected to the Internet that include references to each other with links.

Link: Syntax that instructs a browser executing the syntax to access a network resource defined directly or indirectly by the syntax. The link syntax and/or internal browser functionality may also define conditions under which the access request is made by the browser, for example through cursor position and/or other interaction with an I/O device such as a keyboard or mouse. Some link syntax may cause the browser to access the specified network resource automatically while processing the syntax without user prompt or interaction. Links include HTML hyperlinks. A link may be directly coded with, for example, HTML tags and an explicit URL, or may be in the form of a script or other called function defined in a browser and/or in a webpage.

Network Resource: A web page, file, document, program, service, or other form of data or instructions which is stored on a network node and which is accessible for retrieval and/or other use by other network nodes.

Computer Sketch: Digital data created by user interaction with one or more computer interface devices in a manner that generates image data defining one or more visually recognizable lines and/or shapes when displayed on a computer screen or printed from a file containing the data. This includes, without limitation, image data defining lines or otherwise defined areas that can be interpreted as renderings of one, two, or three-dimensional geometric shapes, surfaces, edges, corners, letters, numbers, or any other type of symbol.

Educational Technology: Technology that supports education. Educational technology can include use of processors, user input and output interfaces, software, the internet, and/or cloud services to facilitate learning.

Computer Sketch Component: Some portion of a computer sketch, which can be a line, a shape, or any other image element. A computer sketch component may be a pixel or a set of pixels. A computer sketch component may be represented through parametrization. A computer sketch component may be part of a Scalable Vector Graphics (SVG) representation or other representation of an image and can include parameters that designate the beginning and end of a line, parameters of a Bezier curve or elliptical lines, parameters that designate the center of a circle or ovals, or parameters that designate line width and line color. A computer sketch component represented in one format can be converted to be represented in another format without necessarily changing the geometric characteristics or interpretation of the component. For example, a computer sketch component represented as an SVG can be converted to be represented as a bitmap image and vice-versa. Image manipulation and comparisons that can be done with one image representation can also be done with other representations.

Sketch Guidance Element: An output of educational technology presented to a user to encourage the user to create, delete, or modify one or more computer sketch components to improve the similarity between a computer sketch generated by the user with a pre-defined model computer sketch.

Model Computer Sketch: A computer sketch that is used as a benchmark to compare with a computer sketch created by a user of education technology. A model computer sketch can be the correct or target computer sketch of an assignment, or it may be another computer sketch different from the target of the assignment.

Description of Example Implementations

The educational technology system and method described herein is an educational system for teaching students through use of sketching assignments. These sketching assignments can be technical drawings that show Top, Side, and Front views, 3D isometric views, cross sections, or other types of technical drawings. These sketching assignments can be aimed at improving students' spatial visualization skills. The sketching assignments can be in the field of math and can use pie-charts, number lines, or other shapes to teach fractions. The sketching assignments can be in the field of physics and use Free Body Diagrams and force vectors. Indeed, the educational technology system described herein can be applied to a wide range of educational areas where sketches are used. This is only a partial list, as sketching is employed in a wide range of educational areas. Accordingly, the term "educational sketching" is used herein to describe any educational activity in which students sketch as part of the learning or assessment process. Systems and methods are presented here to provide guidance output to a user in an educational technology system.

Some systems and methods for teaching sketching are described in United States Patent Application Publication No. US 20200175889 A1 titled METHOD FOR FREEHAND SKETCH TRAINING, which has the same inventor as this application. This patent application is referred to by '889 and is hereby incorporated by reference in its entirety. Sections [0101] and [0102] of '889 describe a range of systems and methods for generating sketches by a user, which can also be applied to the systems and methods described herein.

FIG. 1 illustrates a functional block diagram of one implementation of an educational technology system that provides guidance to a user. In this system, a user 24 interacts with a computer sketch input interface 26 such as a touchscreen as one example, generally in response to a sketch assignment output to the user on an output interface 38 such as a display at the initiation of the interaction. The interaction is interpreted by a sketch generator 28 to create a computer sketch. When the user has completed creating a computer sketch, the user may submit the sketch for evaluation at 32. A pass/fail sketch comparator 30 determines at least some similarities and differences between the submitted sketch and a model sketch 34. These similarities and differences are quantified into a numerical value by a sketch error quantifier 44. The value may be used to produce a binary pass/fail output 50. The pass/fail result is delivered to the user 24 at 74 on the output interface 38. In the event of a failing result, the user may modify the previously submitted computer sketch and submit the modified sketch for evaluation. This cycle may be repeated until a passing result is obtained for the assignment.

In some implementations, after receiving a failing result but before making computer sketch modifications, the user 24 may request guidance at 29. In that event, a guidance sketch comparator 48 evaluates similarities and differences between the previously submitted sketch and the model sketch 34 and generates content for a guidance element for the user. This content is formatted by a guidance element generator 54 into a sketch guidance element sent to the output interface 38 at 72 for display and review by the user 24. In the implementation of FIG. 1, the guidance element may be a graphical indication of which lines in the submitted sketch are correct or are not correct, and/or showing some or all the lines of the model sketch 34. It will be appreciated that the functionality of the pass/fail sketch comparator 30 and the guidance sketch comparator 48 may overlap, and the guidance sketch comparator 48 may utilize some or all the comparison results previously produced by the pass/fail sketch comparator 30 when generating guidance element content. Some specific implementations of the functional blocks of FIG. 1 are described in detail in the '889 application, which is incorporated by reference herein. The components in the dashed line box may be accessed over the Internet as cloud-based services. The input interface 26, output interface 38, and sketch generator 28 may be formed by a desktop or handheld computing device running application software.

Figure 2A:
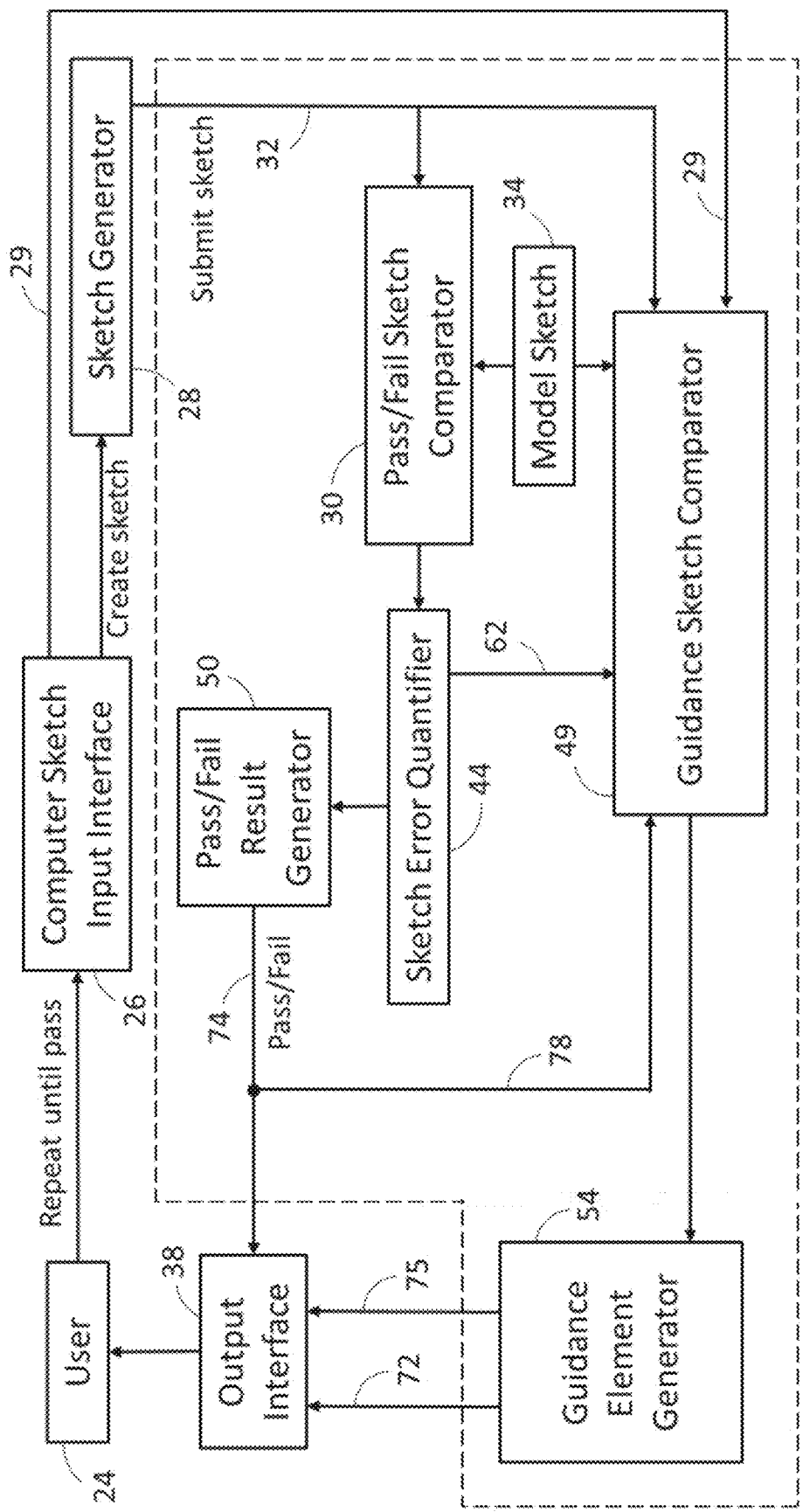
FIG. 2A is a functional block diagram of a system for sketch training including automated guidance delivery.
Figure 2B:
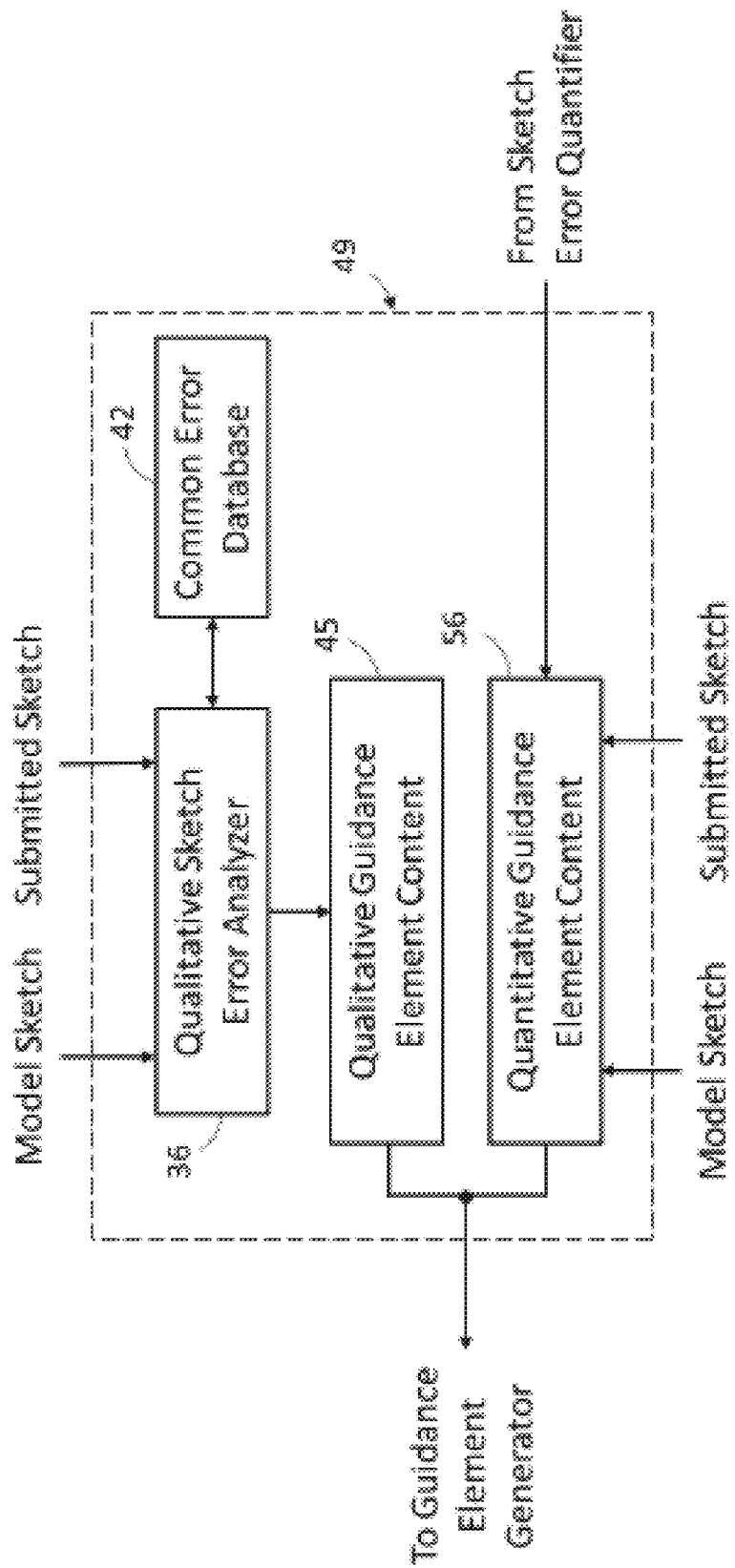
FIG. 2B is a functional block diagram of one implementation of the guidance sketch comparator of FIG. 2A.

FIG. 2A illustrates another embodiment of an educational technology system that supports automated feedback to a user. In the implementation of FIG. 2A, the guidance element comparator 49 has enhanced functionality compared to the guidance element comparator 48 of FIG. 1. In addition to servicing user requests for guidance as described with reference to FIG. 1, in the system of FIG. 2A if a fail status is present following a sketch submission and evaluation, the fail status is detected by the guidance sketch comparator 49 at 78. This triggers the guidance sketch comparator 49 to perform a comparison between the submitted sketch and the model sketch 34 to generate guidance element content, and a guidance element can be automatically issued by the guidance element generator 54 to the output interface 38 at 75 for viewing by the user without any request for guidance being made by the user. Alternatively, the guidance element content can be made available for viewing by the user in response to a user request. As shown in FIG. 2A at 62, the guidance sketch comparator 49 may use numerical data generated by the sketch error quantifier 44 during the pass/fail grading process. As shown in FIG. 2B, the guidance sketch comparator 49 may include functionality for generating guidance element content that is not used by the guidance sketch comparator 48 of FIG. 1. As will be explained further below, the generation of guidance element content can be tailored for automated delivery without request by the user 24.

The functional blocks of FIGS. 2A and 2B are discussed further below in conjunction with the screen displays showing example guidance elements that may be generated automatically in the system of FIGS. 2A and 2B.

Figure 3A:
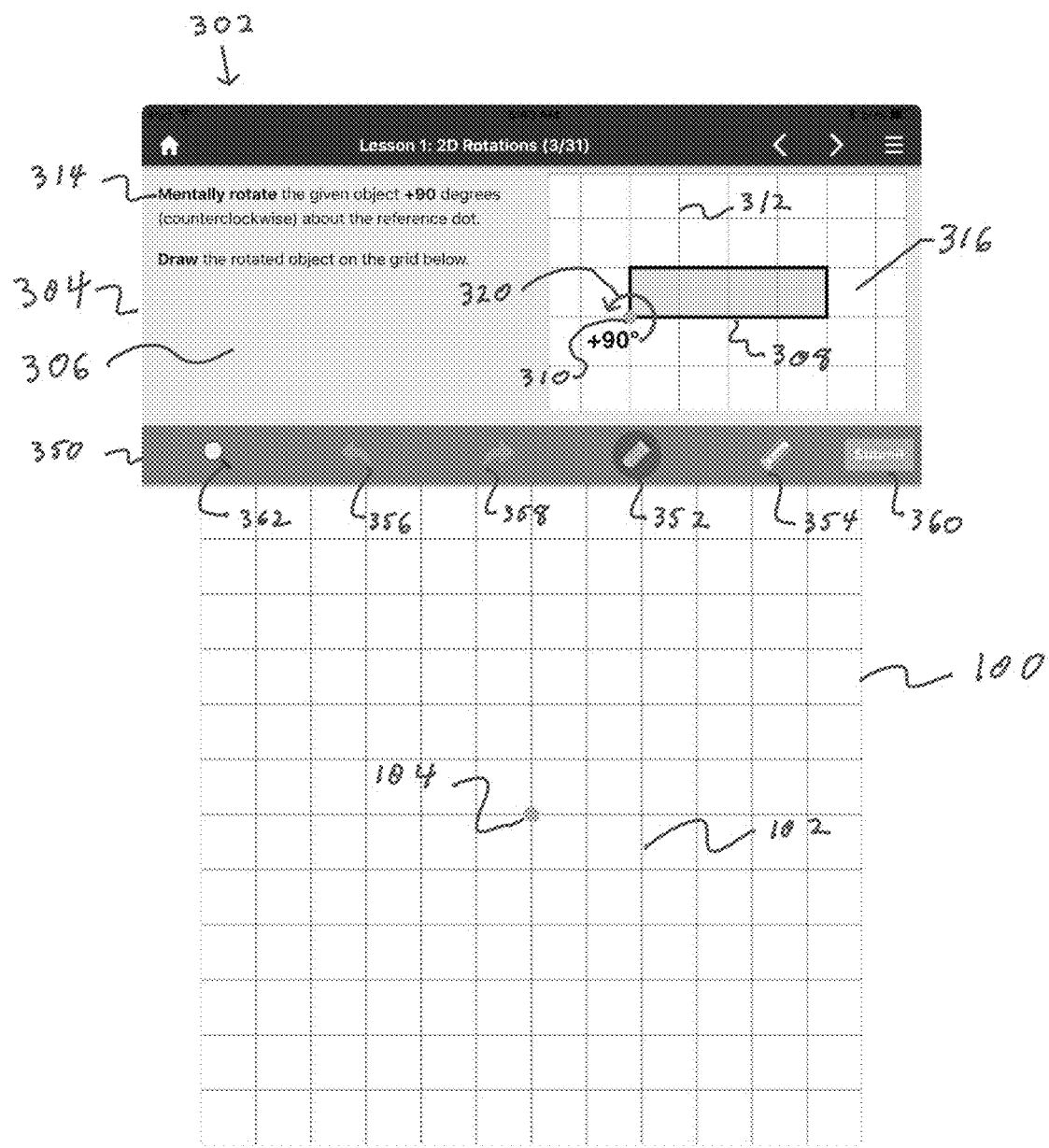
FIG. 3A shows a user interface with an assignment window and sketching window.

For purposes of illustration, embodiments of the inventive computer-based method are described with reference to an exemplary touchscreen device such as the tablet computer. As shown in FIG. 3A an image display 302 can display an assignment window 304 and a sketch window 100. The image display 302 that is part of a computer sketch user interface can be on a touchscreen where a user can draw with a finger or stylus, it can be on a computer display where a use can draw via a touchpad or mouse, it can be a display integrated into virtual or augmented reality glasses, it can be a display on a smart contact lenses such as developed by Mojo Vision, or other type of display that present an image to a user. The system could allow the user to sketch in freehand, allow snap-to-grid or snap-to-object-feature which would draw straight lines between grid points or points on features of objects, or the system could draw a straight line between the point at the beginning of sketch trajectory and the point at which the user pauses for a specified duration. The assignment window 304 includes an assignment description 306 which further includes one or more assignment figure 316 and an assignment text description 314. The assignment figure 316 can include an assignment image 308 and indicators for image movement, such as an arrow 320 and/or an amount of rotation or movement, as shown in FIG. 1A. The assignment description 314 can be a text description of the objective of the assignment. In the example provided in FIG. 3A-4C, the assigned exercise is to "Mentally rotate the given object +90 degrees (counterclockwise) about the reference dot. Draw the rotated object on the grid below." The assignment area 316 can include an assignment reference dot 310 and an assignment grid 312.

Referring to FIG. 3A, following the instructions provided in the assignment description 306, the student draws their attempted solution in sketch window 100. Sketch window 100 can include a sketch grid 102 and a sketch reference dot 104. A number of drawing tools in toolbar 350 shown in FIG. 3A can be made available to the user. A pencil tool 352, an eraser tool 354, an undo tool 356 and redo tool 358 which can be selected to undo or redo recent user actions. A zoom tool can 362 can be used to enlarge or reduce the image on the assignment window. Further description of a possible sketching interface is described in '889 [0103] and [0104].

Figure 3B:
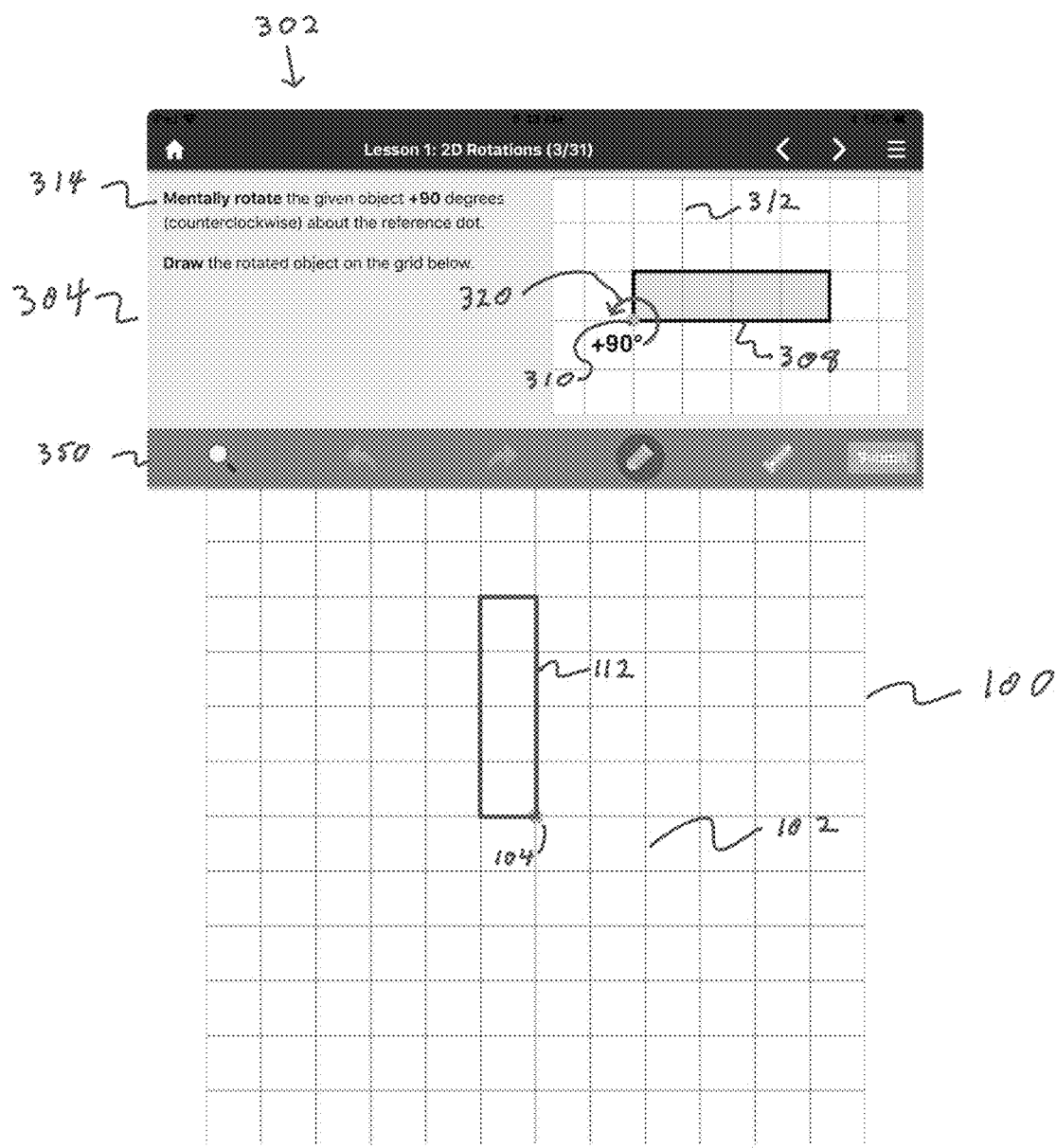
FIG. 3B shows a model computer sketch for the assignment described in FIG. 3A.

As described above, the objective of the sample assignment in FIG. 3A is to mentally rotate the illustrated rectangle 308 90 degrees counterclockwise (indicated by arrow 320) about the reference dot 310, then to sketch the rotated object in the sketch window 100. In this example, the sketched solution is to be scaled in size from the assignment grid 312 to the size of the sketch grid 102. In addition, in this example, the sketched solution is to be positioned relative to reference dot 104 that corresponds to reference dot 310 in the assignment window. FIG. 3B illustrates a model sketch 112, properly positioned relative to reference dot 104 on grid 102. If a user sketches an image that is similar to the model sketch 112, the sketch would be graded as correct and the student would pass the assignment. However, the amount of deviation between a student's sketch and a solution must be evaluated for proper grading. Systems and methods for quantifying the amount of error are described in the '889 publication.

Figure 4A:
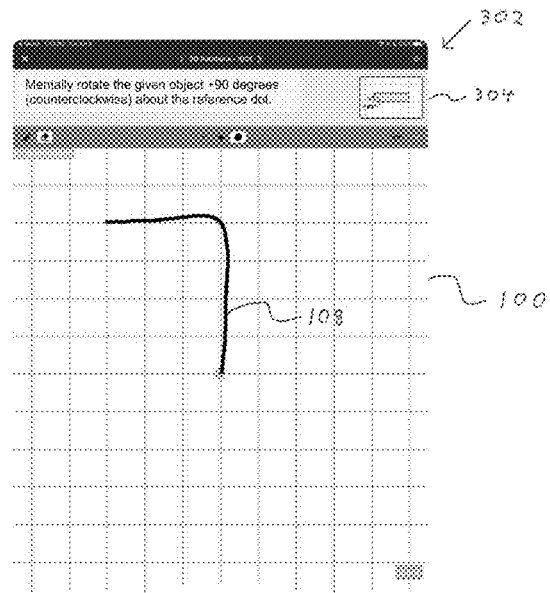
FIG. 4A shows an example user submitted computer sketch for the assignment described in FIG. 3A.
Figure 4B:
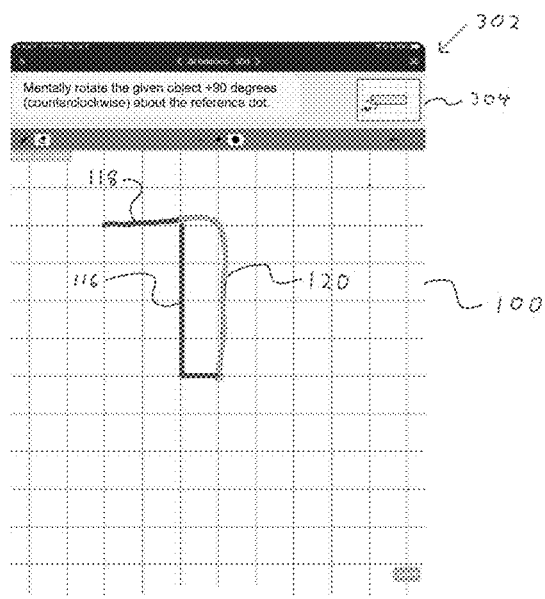
FIG. 4B shows computer sketch components that correspond to the user sketch shown in FIG. 4A compared to the computer sketch components of the model computer sketch of FIG. 3B.

FIG. 4A shows a user sketch 108 in response to the sketching assignment described in FIG. 3A. The sketch image 108 is not correct and differs from the solution 112 shown in FIG. 3B. Specifically there are image components of the sketch 108 that are not present in the solution 112, which can be referred to as additional image components, incorrect image components, or incorrect lines. There are also image components of the solution 112 that are not present in the sketch 108, which can be referred to as missing image components or missing lines. FIG. 4B shows in green image components 120 that can be considered as correct. Also shown in FIG. 4B are red image components 118 that can be considered as incorrect, and blue image components 116 that can be considered as missing. A method and system for identifying correct, incorrect, and missing image components is described in '889. Furthermore in '889 a method and system are described that provides feedback to the user that their sketch is incorrect. In '889 FIG. 1 a user interface provides the user the option of retrying the assignment without any assistance or receiving a guidance element in the form of a hint, or in the form of a peek at the solution. The hint guidance element described in '889 shows the user the correctly drawn image components, but not the complete solution. This type of guidance element is shown in FIGS. 2G and 2H of '889. The peek guidance element described in '889 shows the user the complete solution and distinguishes between correctly drawn image components, incorrect components, and missing image components. An example of the peek guidance element is used in '889 is shown in its FIGS. 2I and 2J.

A limitation of the hint approach described in '889 is that delivery of the guidance element relies on an affirmative request from the user, and different users have widely different approaches to obtaining and using guidance elements. Some users rely heavily on the guidance elements and may receive too much information, and thereby reduce the amount of productive struggle that a student undergoes while working on an assignment. Indeed, studies have shown that students who rely too much on the hints and peeks described in '889 have limited gains in skills. To limit the negative impact of this issue, '889 describes a gamification approach that encouraged students to limit their use of the hint and peek option by rewarding the students with more stars or points if they retried the assignment on their own. This approach is described in '889 in sections [0131] through [0136]. However, this gamification approach has unintended negative consequences. Students who care a lot about their points may avoid using the guidance request option and spend unproductive time and have frustration when stuck on a problem. Another limitation is that the guidance element delivery approach described in '889 shows all or part of the sketch solution itself, which may provide more information than needed for the student to solve the problem on their own.

Figure 4C:
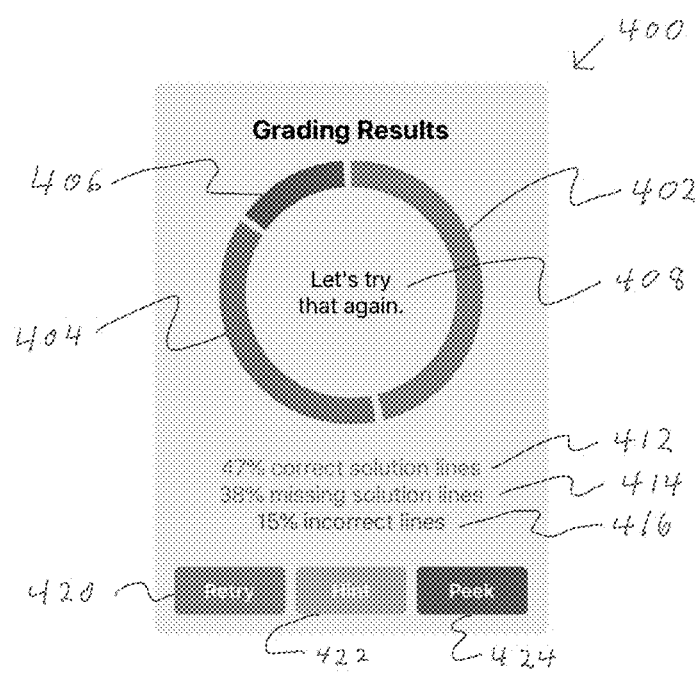
FIG. 4C shows a guidance element display output that corresponds to the user sketch shown in FIG. 4A.

The method and system described herein includes automated delivery of guidance elements provided by the software running on a processor without a request for guidance from the user. This approach can help make the training or learning process more consistent across different types of users because the users that would normally request guidance may not need any more than the automated guidance. Furthermore, users that resist requesting guidance can get some to avoid frustration with many failing attempts. However, some systems that support automated guidance delivery can't use guidance elements such as are described in the '889 publication for automatic delivery because they provide too much information, sometimes the entire solution. Instead, the guidance elements provided in an automated guidance delivery system should deliver less information to the user, but enough information to provide some assistance in finding the correct solution. Guidance elements such as these may be referred to herein as mini-hints and can be provided unsolicited to a student without any point or grade penalty. One type of mini-hint is shown in FIG. 4C which may be in response to the sketch shown in FIG. 4A. Information can be provided to the user as feedback which serves as a hint. This feedback information can be in the form of a guidance element display output 400 which can contain a graphical indicator for correct image components 402, a graphical indicator for missing image components 404, and a graphical indicator for incorrect image components 406. In addition or alternatively, there can be a text indicator for correct image components 412, a text indicator for missing image components 414, and a text indicator for incorrect image components 416. The message 408 is a message that provides text information to the student. The feedback image 400 also can contain a Retry button 420, a Hint button 422, and a Peek button 424. The correct graphical indicator 402 and text indicator 412 both convey a representation of an approximate percentage of the sketch that has been drawn correctly. The graphical indicator 404 and text indicator 414 both convey a representation of an approximate percentage of the sketch that is missing. The graphical indicator 406 and text indicator 416 both convey a representation of an approximate percentage of the sketch that is incorrect, which is also referred to as additional image components in '889. These percentages may be determined by leveraging the analysis performed by the sketch error quantifier 44 in evaluating the pass/fail status of the user's sketch or they may be determined by alternative algorithms or by repeating some or all the algorithms used for the pass/fail determination.

In the example of FIG. 4C, the information provided by the quantitative guidance element content 56 is in the form of percentages as described above. It will be appreciated that any quantitative measure characterizing similarities and/or differences between the submitted computer sketch and the model computer sketch could be used. The displayed quantitative measure can be absolute such as a graphic and/or textual display indicating that 4 lines are correct and 2 lines are incorrect. The displayed quantitative measure may be a comparison of an amount to a total such as set forth in the example of FIG. 4C. The displayed quantitative measure may also be a comparison of two or more similarities and/or differences, such as a graphic and/or textual display indicating that there are twice as many correct lines as incorrect lines.

An advantage of the mini-hint in FIG. 4C is that it provides the students some information about their sketch but does not show them specifically which lines are correct and which are incorrect. Accordingly, the student needs to engage in active learning to benefit from the information in the mini-hint. The student may make a hypothesis as to where they should draw the next line or which part of the sketch is incorrect and should be erased. After implementing their hypothesis, they can receive an additional mini-hint which will let them know if their sketch update brought them closer to the solution. This type of active learning is important for developing persistence and ability to retain knowledge. If the student is still stuck after seeing one or more mini-hints, they can select the Hint button 422 to see a hint such as those in '889. Alternatively, the student may select the Peek button 424 and see a peek of the solution as such as those in '889. Point penalties may be implemented for use of the Hint or Peek buttons, but the mini-hints can be provided as "free hints" that do not reduce a student's score. The system can allow the student to use the Retry button without any point penalty. The exemplary system provides mini-hints to the student automatically while providing the hints described in '889 only in response to a student request. However, alternative systems can be implemented where mini-hints are provided in response to a user request and the content of mini-hints and hints can be interchanged to provide a wider range of implementation methods to best suit student needs. Indeed a mini-hint is a type of hint, and the term hint may refer to either a mini-hint or a hint.

Figure 5A:
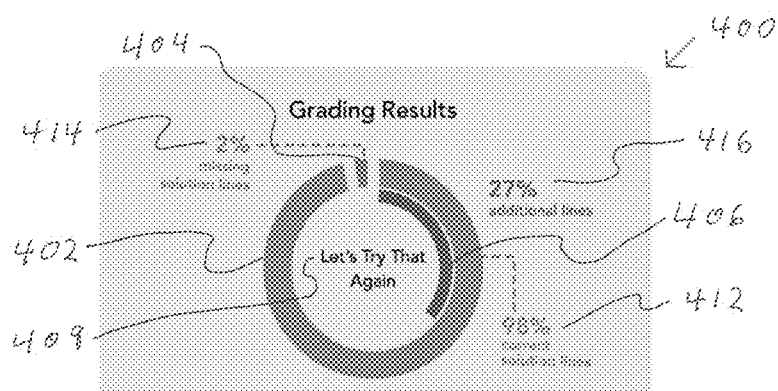
FIG. 5A shows a guidance element display output with inner and outer rings.

There can be a wide variety of guidance element formats which can be implemented that can provide mini-hints to the user. FIG. 5A shows a feedback image 400 for a guidance element in which the correct graphical indicator 402 and the missing graphical indicator 404 form a circular shape. The combined arcs of 402 and 404 can form a complete circle to represent that the complete solution can be represented by a combination of the representation of correct lines and missing lines. The incorrect graphical indicator 406 forms a second circular arc indicator of a different radius. Since the magnitude of the incorrect lines can be independent from the magnitude of the correct or missing lines, the second circular indicator for incorrect lines allows a representation that does not detract from the representation of correct and missing lines as a complete circle.

Figure 5B:
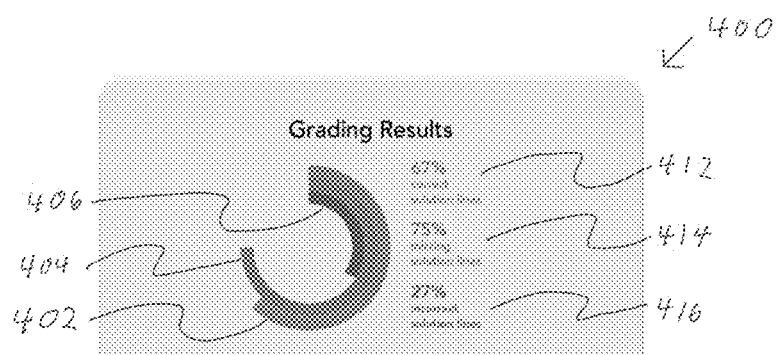
FIG. 5B shows a guidance element display output with three concentric rings.
Figure 5C:
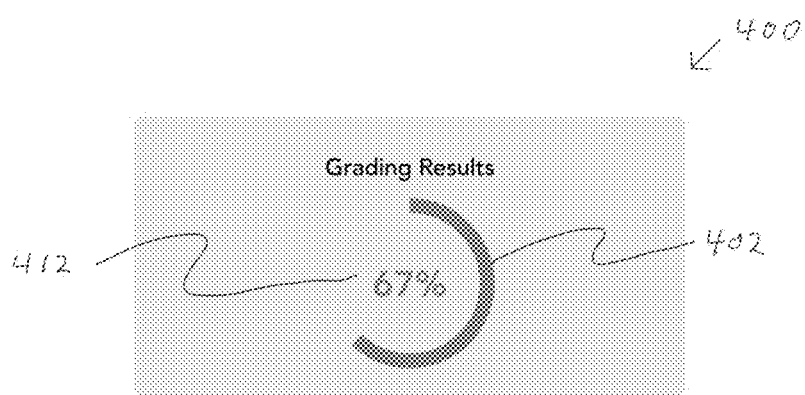
FIG. 5C shows a guidance element display output with a single ring that represents the magnitude of the correct sketch components.
Figure 5D:
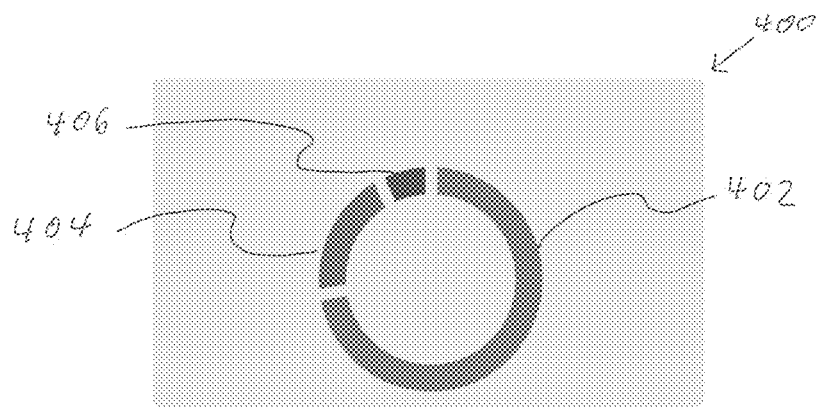
FIG. 5D shows a guidance element display output with graphical indicators but no text indicators.
Figure 5E:
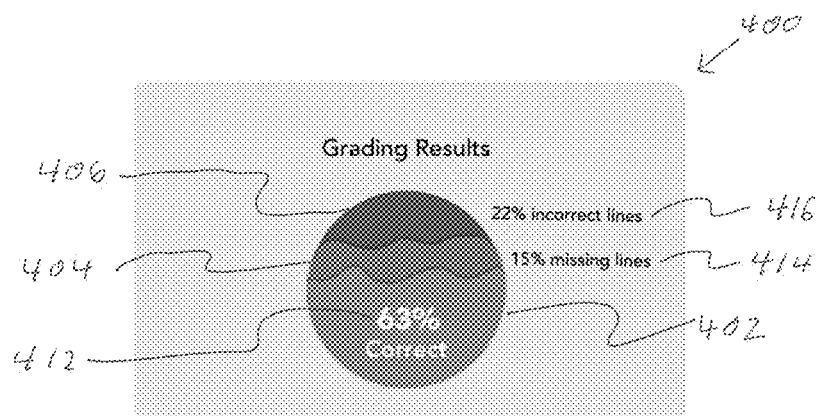
FIG. 5E shows a guidance element display output with graphical indicators are based on area.
Figure 5F:
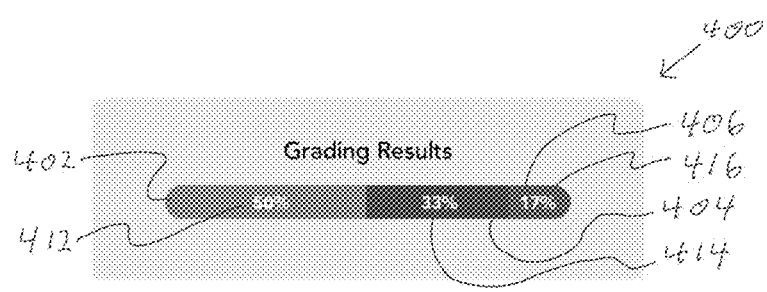
FIG. 5F shows a linear bar guidance element display output.
Figure 5G:
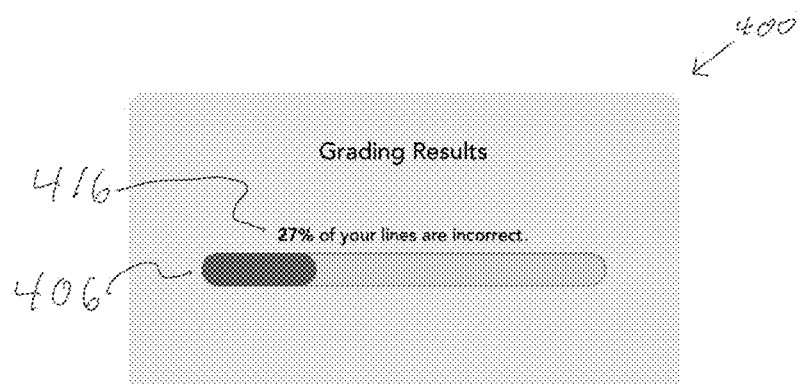
FIG. 5G shows a guidance element display output with only an indication of the magnitude of the incorrect image components.
Figure 5H:
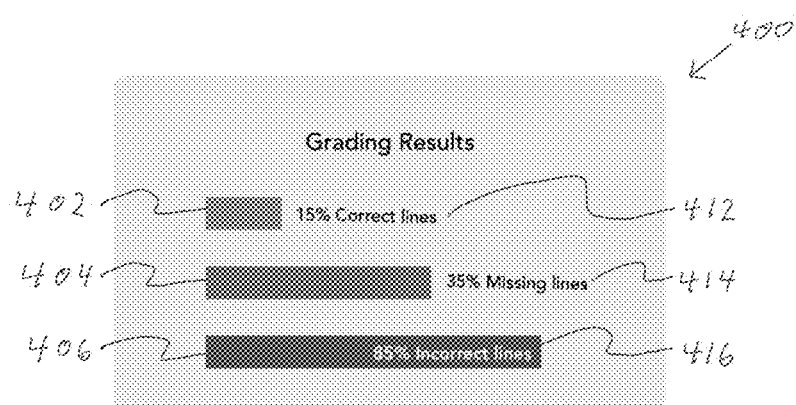
FIG. 5H shows a guidance element display output with three separate linear bars.
Figure 5I:
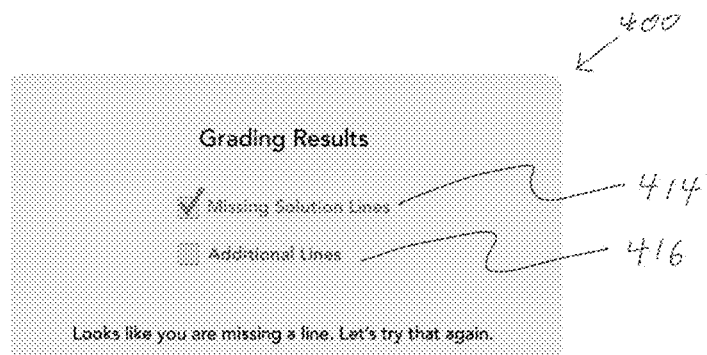
FIG. 5I shows a guidance element display output with text indicators but no graphical indicators.

FIG. 5B shows another form of a feedback image 400. Here a correct graphical indicator 402, a missing graphical indicator 404, and an incorrect graphical indicator 406 form circular arcs each with a different radius. FIG. 5C shows a feedback image 400 which has a correct graphical indicator 402 and a correct text indicator 412, but no indicators for the magnitude incorrect image components even if such components exist. By not showing a representation of the magnitude of the incorrect image components, the mini-hint conveys even less information which can be beneficial for students who are capable of solving a problem with a smaller hint. FIG. 5D shows a feedback image 400 which has a correct graphical indicator 402, a missing graphical indicator 404, and an incorrect graphical indicator 406, but there are no text indicators. The lack of text indicators may encourage more thoughtful exploration by students because it prevents them from making very small changes in a sketch and being able to see a very small numerical change in a text indicator. FIG. 5E shows a feedback image 400 which uses graphical representations of area rather than arc lengths. The area of 402 represents the magnitude of the correct image components, the area of 404 represents the magnitude of the missing image components, and the area of 406 represents the magnitude of the incorrect image components. FIG. 5F shows a feedback image 400 which uses linear progress bars to indicate a correct graphical indicator 402, a missing graphical indicator 404, and an incorrect graphical indicator 406. FIG. 5G shows a feedback image 400 which uses a linear progress bar to indicate an incorrect graphical indicator 406, but no indicators for the magnitude of correct or missing image components even if such components exist. By not showing representations of the magnitude of the correct or missing image components, the mini-hint conveys even less information which can be beneficial for students who are capable of solving a problem with a smaller hint. FIG. 5H shows a feedback image 400 which uses separate linear progress bars 402 to indicate correct image components, 404 missing image components, and incorrect image components 406. In FIG. 5H the text indicators 412, 414, and 416 indicate percentage amounts. In FIG. 5H, the percentage of correct and missing do not add to 100%. In this representation the percentages of correct and incorrect lines do add to 100%. The calculation of the magnitude of the indicators is described in other parts of this disclosure. FIG. 5I shows a feedback image 400 which use text indicator 414 to convey the presence or lack of missing image components, and text indicator 416 in convey the presence or lack of incorrect image components which are referred to as additional lines. However, there are no graphical image components or a text indication of the magnitude of the correct, missing, or incorrect missing image components in this feedback image. In general, a hint and mini-hint image can convey information through use of a wide range of shapes and text characters. Some of these hints include more information and some purposely exclude certain information.

Feedback to the user of hint and mini-hints may take forms other than or in addition to a feedback image. There can be auditory sounds that relate to the correctness of a sketch where different pitch and volume correspond to magnitudes of the correct, missing, or additional image components. A computer generated voice could read out the words and numbers in text indicators. Haptic feedback such as vibrations or jolts could correspond to magnitudes of the correct, missing, or additional image components. Light flashes could be used to convey the magnitudes or presence of correct, missing, or additional image components.

Components of the guidance elements in FIG. 4C-5I convey the magnitude or presence of correct image components, missing image components, and/or incorrect image components. The magnitudes can be calculated in a number of different ways. Patent application '889 in sections [0115] through [0118] describes one way of estimating the magnitude of missing image components and incorrect image components which are referred to erroneous image components and additional components in '889. The flow charts in FIGS. 8 and 9 of '889 describes how the magnitudes of missing and additional image components are used to determine if a sketch can be graded as correct. The method described in '889 does not rely on calculation of the magnitude of the correct image component for the purposes of sketch grading. To address this need, the magnitude of a correct image components can be estimated in a number of ways. In some embodiments, the inventive approach employs the MATLAB® command "regionprops," which calculates measurements of connected regions within an image. Measurements of an image component includes the size of a bounding box, the length of the longest side of a bounding box, the diagonal of a bounding box, the number of pixels, the area covered by the segment, the diameter of a bounding circle, the major axis of the ellipse that has the same normalized second central moments as the segment, the perimeter of the segment, or other methods. When an image has a number of elements such as distinct connected regions the magnitude can be quantified in a number of ways including summing the magnitude of the various regions, identifying the maximum magnitude of the various regions, counting the number of distinct connected regions, or other method. For example, the magnitude of a correct image component can be calculated by summing the pixels of all connected regions within the correct image component. The magnitude of the correct image component can also be estimated by subtracting the magnitude of the missing image components from the magnitude of the solution image components.

The presence of an image component can be determined by whether the magnitude of the image component is greater than zero. For example, if an image component has zero pixels or zero connected regions, then it can be designated as not being present. The presence of an image component can be used in a feedback hint such as shown in FIG. 3I.

The inventive approach includes meaningful ways to represent the magnitude of various image components. For example, the magnitude of an image component may be in pixels, but to make the number of pixels meaningful to a student working on an assignment it would more meaningful if represented terms of the assignment being worked on and possibly the sketch submitted. The feedback images in FIG. 2C-3I include percentage values, lengths of lines or arcs, or area of shapes. The length of line or arcs and areas of shapes can be represented in terms of percentage of the feedback image. Accordingly, to generate the images and text in the feedback image it is necessary to calculate percentages that represent some or all of the correct, missing, or incorrect image components. An equation to calculate the representation of the magnitude of the correct image component, C, can be:

$$C = \text{Magnitude of the Correct Image Component} / \text{Magnitude of the Solution Image}$$

The magnitude of the solution image can be calculated in the similar manner that the magnitude of the correct image component is calculated, and the value of C can be converted to percentages. In addition, a threshold of 100% can be placed on C so that that its value never exceeds 100%, which may occur do zig zag lines drawn by the user or image processing inaccuracies. An equation to calculate the representation of the magnitude of the missing image component, M, is M=1−C. An alternative equation is:

$$M = \text{Magnitude of the Missing Image Component} / \text{Magnitude of the Solution Image}$$

In FIGS. 4C, 5D, 5E, and 5F a representation of the magnitude of the correct image components is presented in a fashion where the sum of the correct, missing and incorrect are a whole or 100%. In a student's submitted sketch there can be a large magnitude for the incorrect image component, which can exceed the magnitude of the missing, correct, and even the solution image. In order to effectively present feedback to the user a denominator, D, can be defined as:

$$D = \text{Magnitude of the Correct Image Component} + \text{Magnitude of the Missing Image Component} + \text{Magnitude of the Incorrect Image Component}$$

The equations for C, M, and the representation of the incorrect image component, "I" can be given by:

$$C = \text{Magnitude of the Correct Image Component} / D$$

$$M = \text{Magnitude of the Missing Image Component} / D$$

$$I = \text{Magnitude of the Incorrect Image Component} / D$$

In FIG. 3H the representation of the magnitude of the correct image components is presented in a fashion where the sum of the correct and incorrect representations add up to a whole or 100%. This approach provides meaningful feedback to the student because it represents the whole of their sketch drawn represented into a category of correct or incorrect. In this case M can be calculated as the magnitude of the missing image component relative to the magnitude of the solution image component. A value of D can be defined as:

$$D = \text{Magnitude of the Correct Image Component} + \text{Magnitude of the Incorrect Image Component}$$

The equations for C, and "I" can be given by:

$$C = \text{Magnitude of the Correct Image Component}/D$$

$$I = \text{Magnitude of the Incorrect Image Component}/D$$

In FIGS. 3A, 3B, and 3G a representation of the magnitude of the incorrect image components is presented in a fashion where the sum of the correct, missing and incorrect do not necessarily add up to a whole or 100%. In such cases the value of "I" can be calculated by scaling the magnitude of the incorrect image component in various ways. One way is to calculate "I" by:

$$I = \text{Magnitude of the Incorrect Image Component}/\text{Magnitude of the Solution Image}$$

If the value of I exceeds a whole, the image or text can exceed 100% or the value can be capped at 100% to avoid student confusion.

Figure 6:
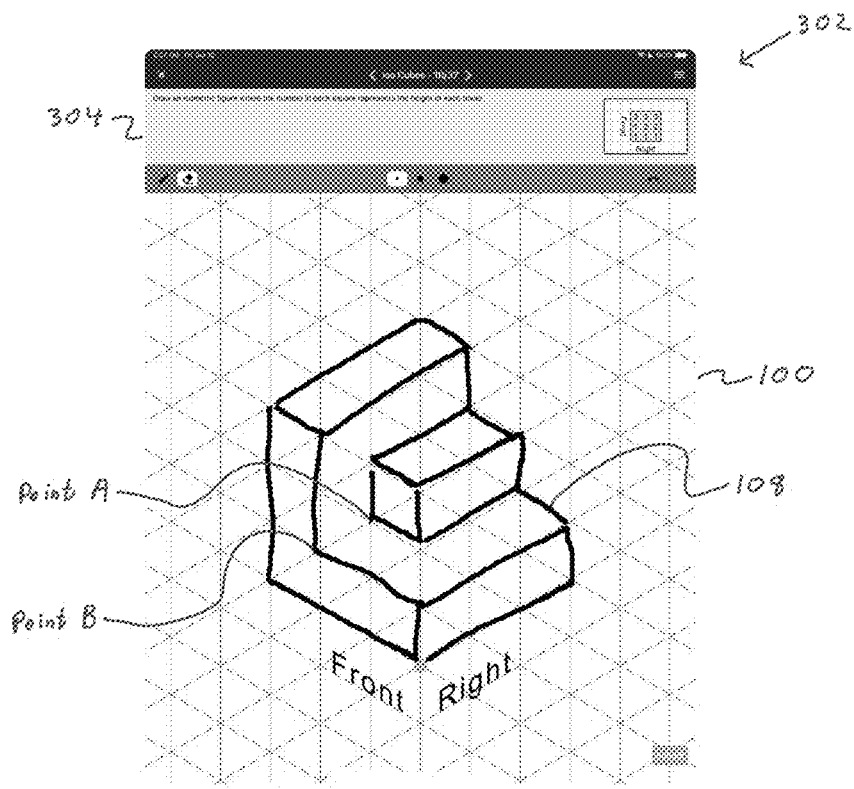
FIG. 6 shows a display of a computer sketch that has an error due to a missing line that was omitted by the user.
Figure 7:
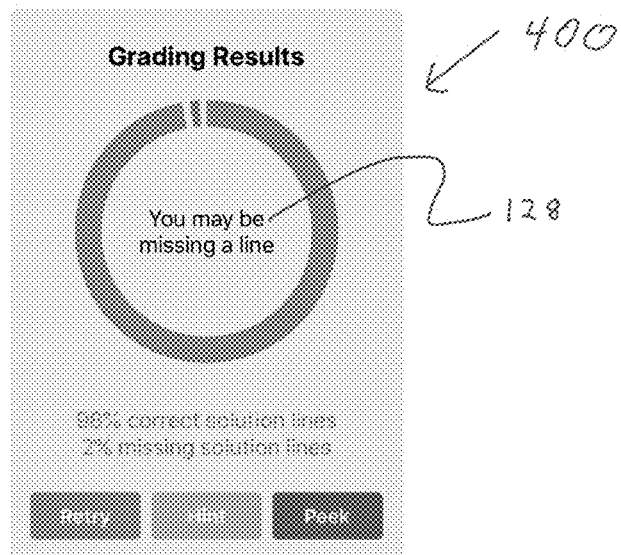
FIG. 7 shows a guidance element output display that may be automatically generated when the computer sketch in FIG. 6 is submitted by a user.

In certain cases, the system may give students specific hints messages. For example, FIG. 6 shows a sketch for an assignment to draw an isometric figure. Here the student drew the sketch image 108, with a mistake of missing a line between point A and point B. This can be a difficult error to spot since the student's mind may subconsciously fill in the missing line. The system may tell the student something qualitative about the sketch, such as "you may be missing a line." This message does not tell the student the location of the missing line, but rather would encourage the student to search the drawing and find the mistake by themselves, which enhances learning retention. The inventive approach includes providing a personalized hint message to the student based upon the sketch that the student submitted. FIG. 7 shows a feedback window 400 with a guidance element 128 that corresponds to the sketch shown in FIG. 6, and thereby lets the student know that their sketch may be missing a line without specifying the exact location of the missing line. These acts may be performed by the guidance sketch comparator 49 of FIG. 2A using block 36 which may generate qualitative guidance element content 45 for use by the guidance element generator 54.

A number of methods can be used to identify a missing line that could trigger a hint message for a missing line. One method utilizes the intermediate values calculated in grading the sketch described in '889. Sections [0125]-[0127] describe a method to determine if a sketch is correct by evaluating a number of test conditions. One of these test conditions is whether the maximum size of continuous missing pixel segments is greater than a threshold. If all the tests pass except for the test of a missing image component, and there is only a single continuous missing sketch component causing the submitted computer sketch to fail, then the hint message for a missing line can be triggered. A threshold can be used which would only trigger the hint if the magnitude of the single continuous missing image segment is less than this threshold. This threshold would prevent a message of "you may be missing a line" from triggering if there is a large amount of the sketch missing, in order to prevent the student from incorrectly construing that the hint implies that they are very close to the solution. Another method for triggering a missing line hint could be used when the sketch is created with a series of lines such as with the snap-to-grid option. When such a computer sketch is created, a list of lines between snap points could be recorded and compared to a set of snap points defined by the model image. If a single line is missing, then the designated hint message could be provided to the user. Other methods could be used to identify a missing line including use of a predefined sketch error which is described in more depth elsewhere in this document.

Figure 8:
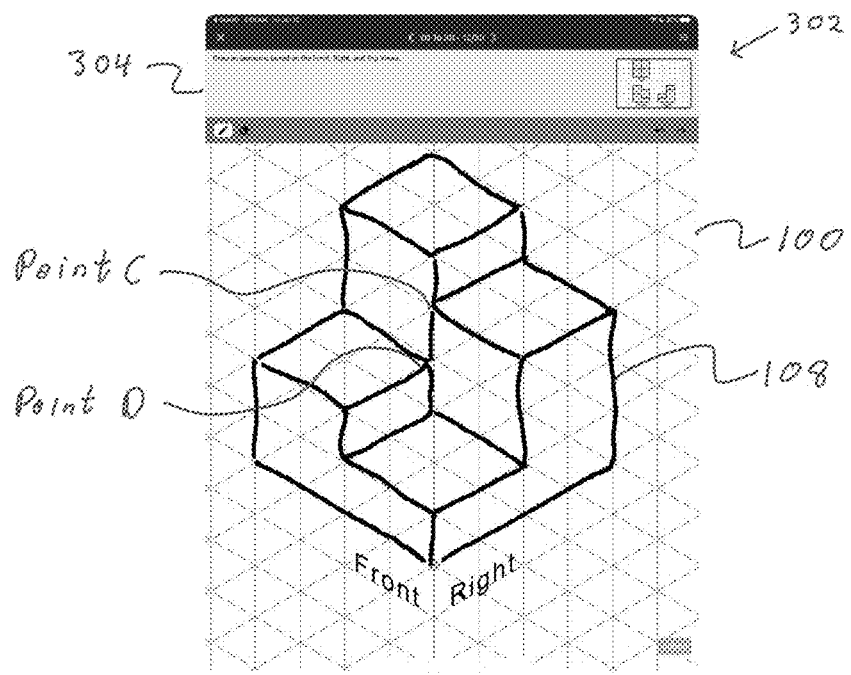
FIG. 8 shows a display of a computer sketch that has an error due to an incorrect line that was drawn by the user.

There are numerous cases where a hint message is appropriate. FIG. 8 shows a sketch for an assignment to draw an isometric figure. Here the student drew the sketch image 108, with a mistake of adding a line between point C and point D where there should be no line. For this sketch a hint message could be "You may have an additional line." A number of methods can be used to identify the conditions that trigger a hint message for an additional line. One method utilizes the intermediate values calculated in grading the sketch described in '889. Sections [0125]-[0127] describe a method to determine if a sketch is correct by evaluating a number of test conditions. One of these test conditions is whether the maximum size of continuous additional pixel segments is greater than a threshold. If all the tests pass except for the test of an additional sketch component, and there is only a single continuous additional sketch component that causes the submitted computer sketch to fail, then the hint message for an additional line can be triggered. A threshold can be used which would only trigger the hint if the magnitude of the single continuous additional sketch component is less than this threshold. This threshold would prevent a message of "you may have an additional line" of triggering if there is a large amount of additional sketch, in order to prevent the student from incorrectly construing that the hint implies that they are very close to the solution. Another method for triggering an additional line hint could be used when the sketch is created with a series of lines such as with the snap-to-grid option. When such a sketch is created, a list of lines between the snap points could be recorded and compared to a set of snap points defined by the model image. If there is a single additional line, then the designated hint message could be provided to the user. Another method could be used when a snap-to-grid option is provided for sketching. In this case, a list of lines drawn by the user could be recorded, and if there is a single additional line then the designated hint message could be provided to the user. Other methods could be used to identify the presence of an additional line including use of a predefined sketch error.

Figure 9A:
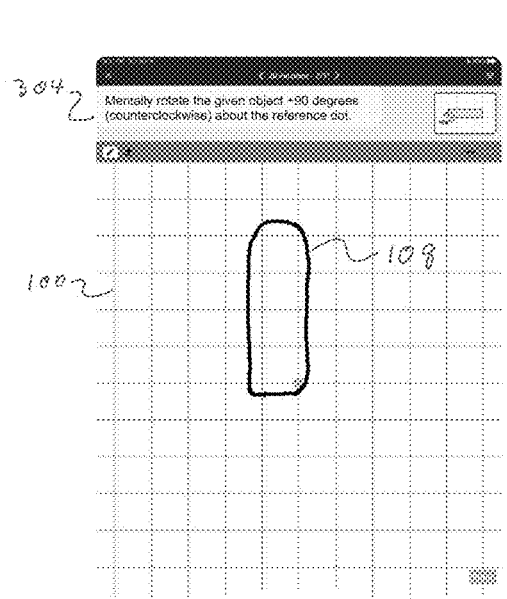
FIG. 9A shows a display of a computer sketch that is not drawn precisely.
Figure 9B:
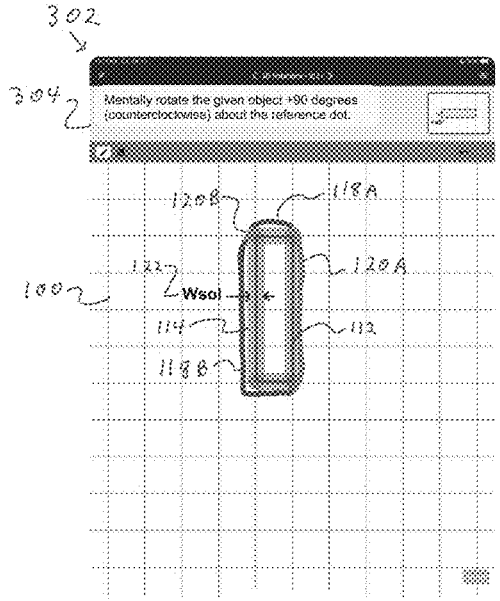
FIG. 9B shows correct and incorrect sketch components of the sketch shown in FIG. 9A.
Figure 9C:
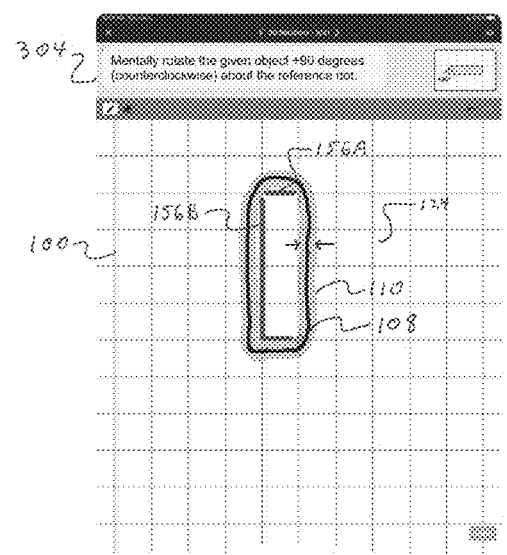
FIG. 9C shows missing sketch components of the sketch shown in FIG. 9A.

Another type of sketch error relates to when a user does not draw precisely enough. An example is shown in FIG. 9A which is a sketch image 108 drawn to the assignment described in FIG. 1A. The sketch 108 drawn in FIG. 9A is approximately in the correct shape of the solution shown in FIG. 1B, yet the lines drawn are relatively far from the solution. A student who receives a grading result that their sketch is incorrect may not know if the reason for the failure is due to their conceptual understanding of the material or the quality of their penmanship. In such a case it may be desirable to provide a hint message to the student that their sketch is close to the solution. This way the students will not waste their time or get frustrated by trying to solve a conceptual error, but rather would redraw their sketch more precisely. This approach is also beneficial for training students to draw precisely. On method for determining if a message "Close! Draw more carefully" is described in FIGS. 9B-9E. FIG. 9B shows the solution image 112 and a solution region 114. The solution region 114 represents an area within which a student's sketch lines will be considered acceptable. One possible solution region 114 would be an area that encompasses the solution sketch 112 with an additional margin for acceptable errors, where the width of this additional margin is Wsol 122. Methods to determine a solution region are described in '889. As shown in FIG. 9B some of the sketch 108 is inside the sketch region 114 and therefore is categorized as correct sketch image components 120A and 120B. However, some of the sketch is outside the sketch region 114 and therefore is categorized as incorrect sketch image components 118A and 118B. FIG. 9C shows the sketch image 108 and a sketch region 110. The sketch region 110 represents an area within which solution lines will not be considered missing. One possible sketch region 110 would be an area that encompasses the solution sketch 108 with an additional margin for acceptable errors, where the width of this additional margin is Wsk 124. Methods to determine a sketch region are described in '889. As shown in FIG. 9C some of the sketch 108 is outside the sketch region 110 and therefore is categorized as missing image components 156A and 156B.

Figure 9D:
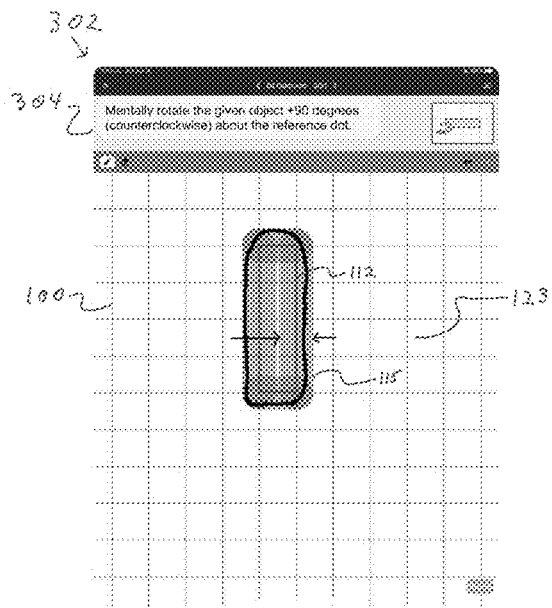
FIG. 9D shows an expanded model solution region that may be generated when evaluating the sketch shown in FIG. 9A.
Figure 9E:
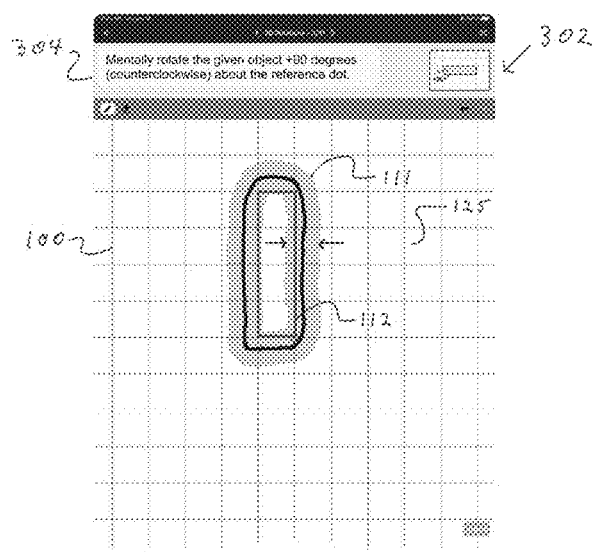
FIG. 9E shows an expanded submitted sketch region that may be generated when evaluating the sketch shown in FIG. 9A.
Figure 9F:
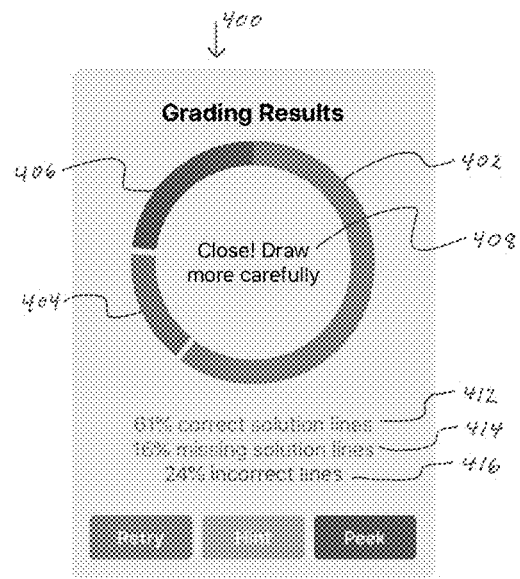
FIG. 9F shows a guidance element display output that may be automatically generated for the sketch shown in FIG. 9A.

Because of the large incorrect image components 118A and 118B, and the large missing image components 156A and 156B, the sketch image 108 shown in FIG. 9A will be graded as incorrect according to a method described in '889. An inventive method to determine if a "Close!" hint message should be given to the student can be evaluated with larger sketch and solution regions. FIG. 9D shows an expanded solution region 115 which has a width Wsolexp 123 which is larger than width Wsol 122 shown in FIG. 9B. As shown in FIG. 9D, all of the solution image 112 is inside the expanded solution region 115. FIG. 9E shows an expanded sketch region 111 which has a width Wskexp 125 which is larger than width Wsk 124 shown in FIG. 9C. As shown in FIG. 9E, all of the solution image 112 is inside the expanded sketch region 111. Accordingly, if the sketch 108 shown in FIG. 9A was graded according to the sketch grading method described in '889, but with an expanded solution region of width Wsolexp 123 and an expanded sketch region of width Wskexp 125, then the sketch would be graded as correct. However, if the desired grading precision is based on the original Wsol 122 and Wsk 124, then a hint can be provided as shown in FIG. 9F which includes the hint message 128 "Close! Draw more carefully." In FIG. 9F, the graphical indicators 402, 404, and 406, along with the text indicators 412, 414, and 416 corresponding to the grading results associated with the original grading parameters Wsol 122 and Wsk 124. A method to determine if a "Close!" hint should be triggered can be implemented by modifying the method described in '889. A sketch can be first graded by the method described in '889 and if the sketch fails, then the sketch can be graded with expanded solution and sketch regions. If the sketch passes only with the expanded regions, then the 'Close!" hint can be triggered.

For the purposes of increasing the speed of the sketch grading, a quick evaluation can be done at the end of the sketch grading described in '889 to see if it is likely that the sketch would pass with extended solution and sketch regions. One quick test would be to see if the properties of the sketch 108 are close to the corresponding properties of the solution image 112. For example, if the number of pixels or bounding box in the sketch image 108 is within a threshold of the number of pixels or bounding box in the solution image 112, then it can be considered worthwhile to run the sketch grading with expanded parameters. Another quick test could be look at just the sketch image that is outside of the expanded solution region to see if its magnitude would eliminate the possibility of the sketch passing even with a full evaluation with expanded parameters.

An alternative to automatically providing a guidance element such as a mini-hint is to allow the sketch to pass, but provide a warning. For example, the sketch shown in FIG. 9A could be allowed to pass since it is close to the solution, but the students would be provided with a warning that next time they should draw more precisely.

Figure 10:
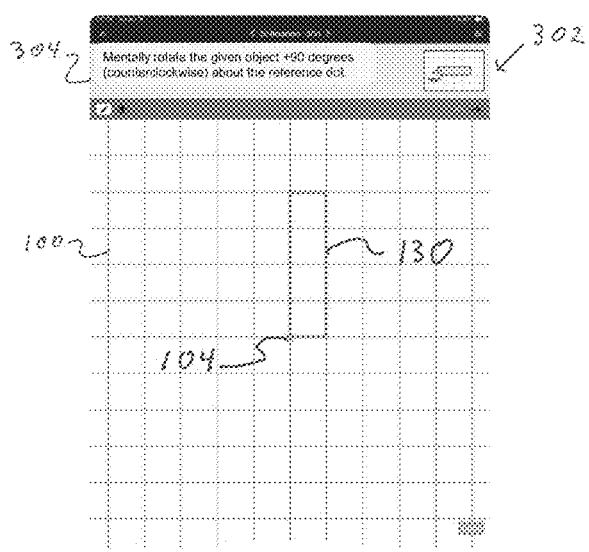
FIG. 10 shows a predefined computer sketch error.
Figure 11:
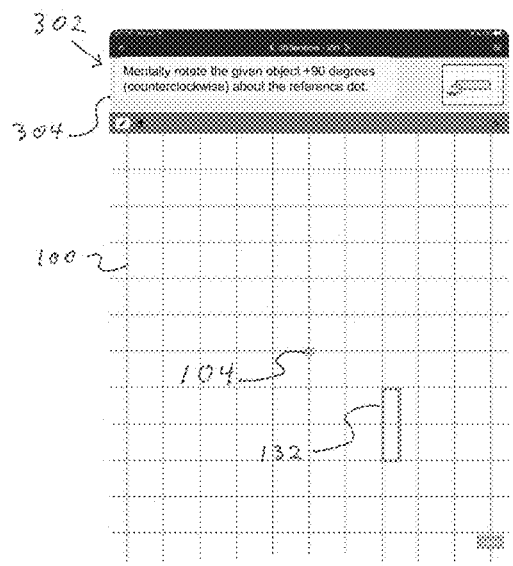
FIG. 11 shows a predefined computer sketch error that includes scale error.

Hint feedback can be based on a student's sketch matching a predefined sketch with a mistake. These may be common mistakes done by a number of students or mistakes that a teacher anticipates. FIG. 10 shows a predefined sketch image with a mistake 130 for the sketching assignment shown in FIG. 3A. The image 130 is drawn to the right of reference dot 104, whereas the correct solution is drawn to left of dot 104 as shown in FIG. 2A. When a student's sketch matches a predefined mistake, then a hint message can be generated specific to that mistake. For example, for the mistake image shown in FIG. 10, a hint message could be "The rotation should be about the dot." Another predefined sketch with a mistake is shown in FIG. 11. The predefined sketch image with a mistake image 132 is in the wrong scale as well as in the wrong location. A corresponding hint message could be "Sketch according to the grid scale." Identification of a sketch that matches a predefined error can build upon a sketch grading approach of '889. A sketch can first be graded according to a method of '889, and if the sketch does not pass then the sketch grading method can be redone but with a predefined sketch image with a mistake instead of a solution. The predefined sketch images for this further comparing process may be stored in the system in the common error database 42 of FIG. 2B.

There are a wide number of predefined mistakes that can occur. A mistake could be to draw the mirror image of a shape. Another predefined mistake could be sketching specific additional line or lines on the face of a flat surface, such as shown in FIG. 8, or missing a specific line or lines in a difficult to notice location such as shown in FIG. 6. For assignments that require mental rotation of 3D shapes, a predefined mistake could be performing the rotation operations in the wrong order. For each predefined mistake there could be a corresponding hint message. For an assignment there could be multiple predefined sketch images with mistakes. As a student submits various iterations of their sketches, they could see different hint messages that correspond to different predefined mistakes.

Figure 12A:
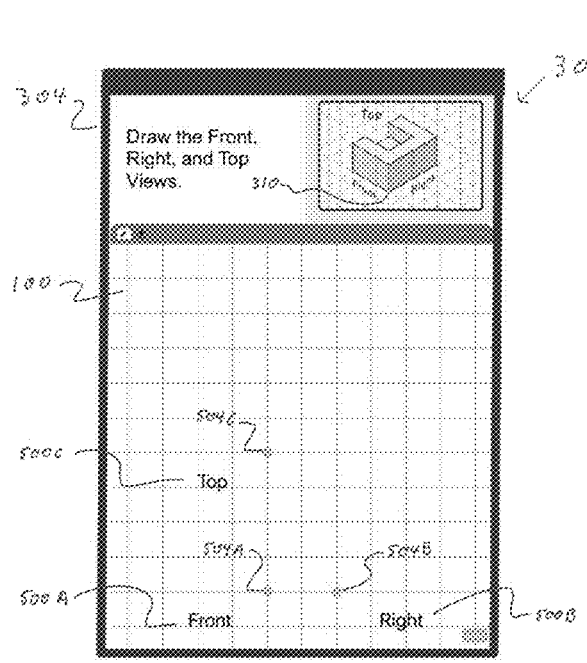
FIG. 12A shows a sketch assignment with orthographic projections.

Another type of sketching error can be in the type of line drawn. For orthographic sketches such as shown in FIG. 12A the assignment is to draw the Front, Right, and Top views. According to technical drawing guidelines, solid lines are to be drawn for visible lines and dashed lines are to be drawn for hidden lines. The location of the different views is designated by a label beneath the location where the view is to be drawn; 500A for Front View, 500B for Right View, and 500C for Top View. A reference dot is shown in each view to help students align the view spacing; 504A for Front View, 504B for Right View, and 504C for Top View. The solution to the sketch of FIG. 12A is shown in FIG. 12C. Each view can have solid line and dashed line components. In FIG. 12A, the solid line solutions are shown as 512A, 512B, and 512C. The Front View has a dashed line 513A in the solution, and the Right View has a dashed line 513B in the solution.

Figure 12B:
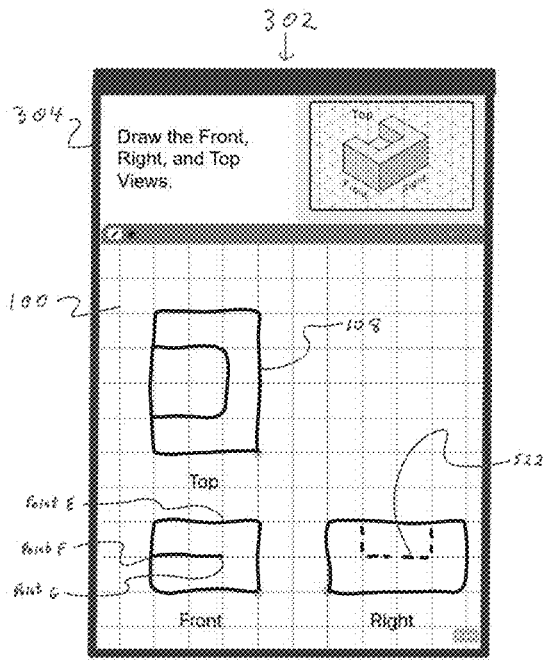
FIG. 12B shows a computer sketch submitted for the assignment shown in FIG. 12A.
Figure 12C:
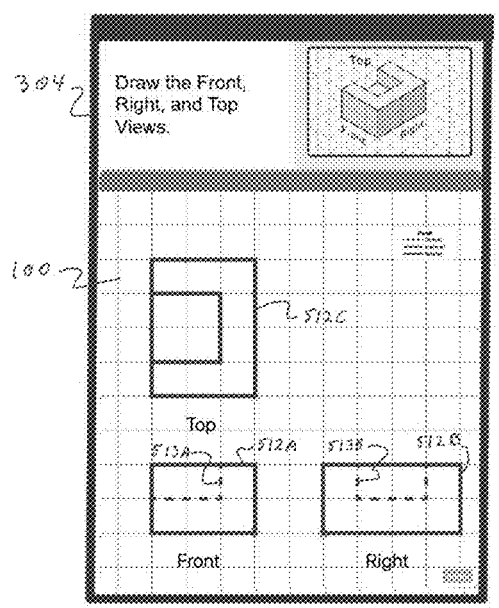
FIG. 12C shows a model computer sketch for the assignment shown in FIG. 12A.

An example of a sketch submitted by a student is shown in FIG. 12B for the assignment show in FIG. 12A. The submitted sketch 108 is correct in the Top View and in the Right View. In the Front View all of the solid lines of the solution are drawn correctly, but there are mistakes where the dashed lines should be. There is no line drawn between Point E and Point G where there should be a dashed line, and a solid line is drawn between Point F and Point G, but a dashed line should be drawn in this location. Accordingly, the only errors in FIG. 12A sketch 108 are in the dashed line of the Front View. A method is presented in '889 that can identify if dashed lines are drawn correctly and is described in sections [0150] through [0173] which reference FIG. 17 and FIG. 18 of '899. This method estimates the largest dash and largest gap in region where dashed lines are present in the solution. If the magnitude of a dash or gap in 108 exceeds a threshold, then the dashed lines are graded as incorrect. Accordingly, if the solid line portions of a sketch are graded as correct, but the dashed lines as incorrect, as in FIG. 12B, then it can be determined that the sketch has failed solely due to incorrectly drawn dashed lines. Under these conditions a hint message such as "Check dashed lines" could be provided in a feedback image.

Another line type can be a draft pen versus a final pen. Draft pens are typically lighter and are used to create construction lines, while a final pen is typically darker and is used to represent the final shape of the solution. In some embodiments, students are directed to start their sketches with a draft pen, and then to trace the solution with a final pen. The images created by a draft pen can illuminate the thought process of the student, and thus a teacher may desire that a student use both draft and final pens. The pens typically have different color and thickness. One mistake students can make is to forget to switch to the final pen. In this case, a sketch is submitted with only draft markings, and a hint message can be included in a feedback image that states "Don't forget to draw the solution with the final pen."

Figure 12D:
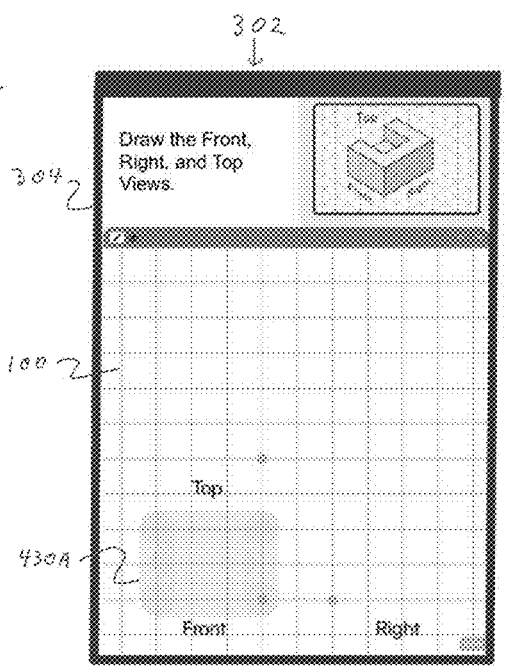
FIG. 12D shows a region of evaluation for the assignment shown in FIG. 12A.

Another type of hint message relates to the region in which a mistake is made. This approach informs the students of the general location of a mistake but does not point it out exactly. This approach motivates student exploration and engagement. An example of this approach is depicted in FIG. 12D which shows the sketch window for the assignment shown in FIG. 12A. A region of evaluation 430A is shown which covers the region in which the Front View is meant to be drawn. The sketch grading method of '889 can be applied solely to the portion of the sketch image and solution image which are inside the region of evaluation. The sketch grading method of '889 can also be applied solely to the portion of the sketch image and solution image which are outside the region of evaluation. In this fashion it can be determined if a sketch error is present only within the region of evaluation, but not outside it. If this approach is applied using the region of evaluation 430A to the sketch shown in FIG. 12B, then the result will indicate that the only error in the sketch is in the Front View, but not specify the exact location of the error within the Front View. In this case a hint message "Check for errors in the Front View" could be included in a feedback image. A similar approach could be applied to the Right View, Top View, or any other region of the sketch. Regions of evaluation can be selected a priori by the assignment authors to be able to provide the most helpful hints.

Another type of hint message can relate to the location of a sketch on the grid 102. For example, in FIG. 10 the shape of the image 130 is correct, and the only error is in the XY translation of the shape relative to the reference dot. There are a number of ways to determine if the only error in a sketch is in the XY translation. One way is to determine the centroid of the sketch 108 and compare it to the centroid of the solution 112. If there is a difference between them, then the sketch 108 can be translated in the XY direction by the amount of this difference, and then graded according to a method described in '889. Another method can be used if a solution point is aligned with a sketch grid 102. In this case the sketch 108 can be translated by all possible grid distances within the sketch window 100, and all of these translated sketches can be graded to see if any of them will pass. Another method can be to use numerical optimization to find an X and Y translation that will minimize the sketch errors described in '889. An optimization tool that could be used for this approach is the MATLAB® command fminsearch. The sketch errors to minimize could be the magnitude of the missing image components and the incorrect image components as X and Y translation values are modified. If a sketch can be translated such that is graded as a passing sketch, then a hint message could be provided "Correct sketch shape but in the wrong location.""

Another type of hint message can relate to the scale of a sketch on the grid 102, or to the scale and location of the sketch. For example, in FIG. 11 the shape of the image 130 is correct, but there is an error in the scale and the XY translation of the shape relative to the reference dot. There are a number of ways to determine if the error in a sketch is in the scale and XY translation. One way is to determine the bounding box of the of the sketch 108 and compare it to the bounding box solution 112. If there is a difference between the length of the diagonal of these bounding boxes them, then the sketch 108 can be scaled by the amount of this difference. The bounding box of an image can be identified with the regionprops command in MATLAB®. Scaling can be done through standard use of transformation matrices used in 2D object manipulation. After the scaling, a similar approach described above can be used to identify if an XY translation exists that will enable to the sketch to pass. In a similar fashion as with the just XY translation, numerical optimization methods, such as fminsearch in MATLAB®, can also be used for identifying optimal values for scaling and XY translation that will minimize the error magnitudes in the sketch grading. If the sketch passes with the identified scaling and translation a hint message can be provided "Sketch according to the grid scale and locate the sketch relative to the reference dot."

Another type of hint message can relate to the orientation of a sketch on grid 102. There are a number of ways to determine if the error in a sketch is due to the orientation of the sketch. One way is to quantify the orientation of a sketch by the angle of the major axis of the ellipse that has the same second-moments as the sketch. If there is a difference between the orientation of the sketch and the solution, then the sketch can be rotated by the amount of this difference. The major axis of the ellipse that has the same second-moments as an image can be identified with the regionprops command in MATLAB®. Rotations can be done through standard use of transformation matrices used in 2D object manipulation. Additional transformation for XY translation or for scaling can also be incorporated as described previously. If the sketch passes with the identified orientation correction, scaling and translation a hint message can be provided "Sketch according to the grid orientation, scale and location of the reference dot."

The methods for identifying translations, scaling, and rotations that match a sketch to a specific solution, can also be used for identifying alternative solutions to sketching assignments. This approach would allow the students to sketch the shape of a solution without being restricted by a translation, scale, or orientation. With this approach once a transformation is found that matches a sketch to a specified solution the sketch can be marked as correct.

Figure 13:
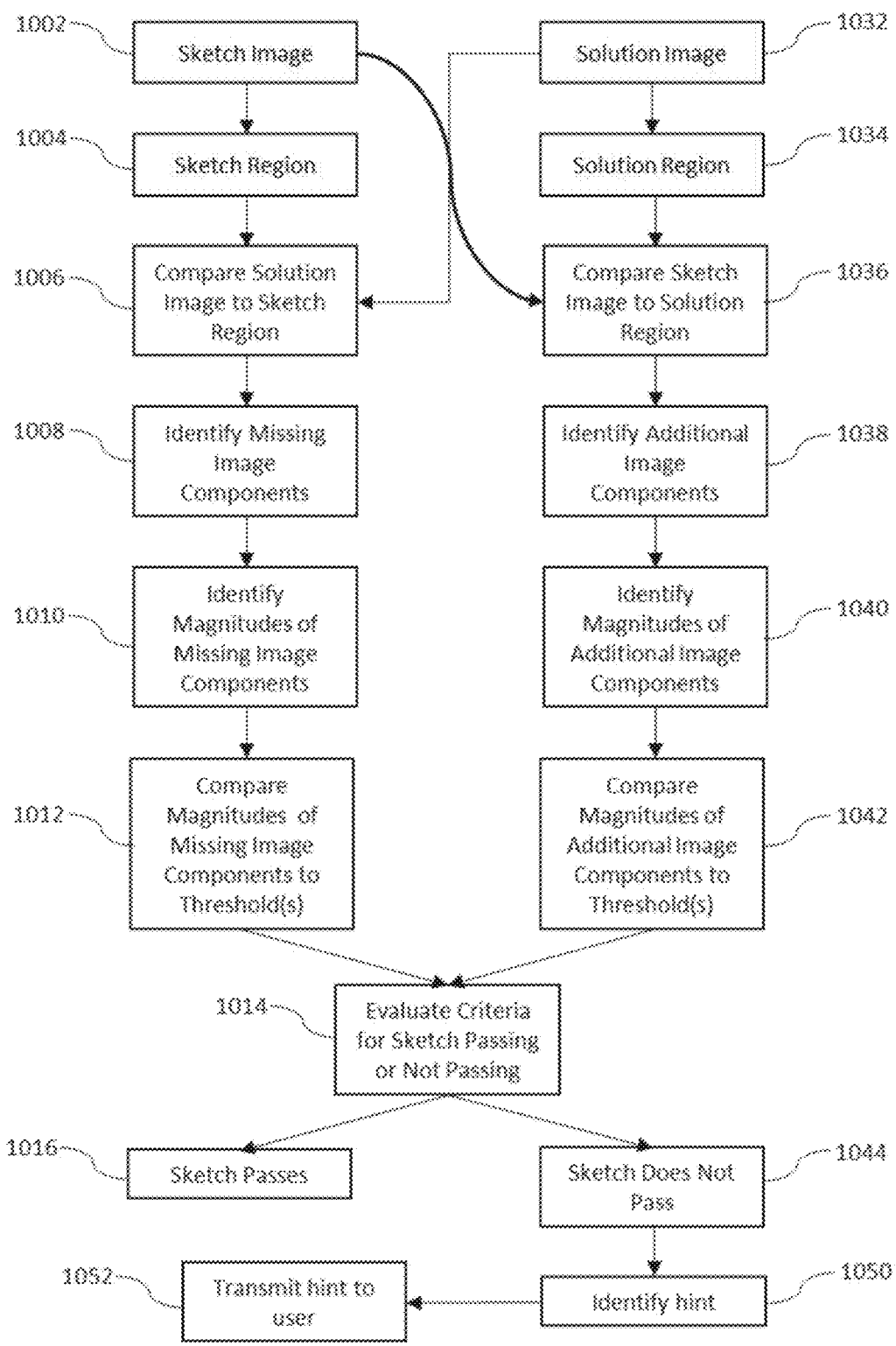
FIG. 13 shows a flow chart of a sketch grading process.

FIG. 13 is a flow chart illustrating the steps of an exemplary method of sketch grading according to an embodiment of the invention. Many of the initial steps are described in '889. An initial step 1002 is generation of a sketch image 108 by the student. The solution image 112 is used in the sketch grading and is acquired in step 1032. The solution image 112 is typically generated by the assignment author during the process of creating the assignment. From the solution image 112, a solution region 114, such as shown in FIG. 9B, is generated in step 1034. The sketch image 108 is compared to the solution region 114 in step 1036. Segments of correct image component 120 are shown in FIG. 9B as 120A and 120B, correspond to segments of the sketch image 108 that fall within the solution region 114. Since the sketch image 108 may have been drawn freehand, perfection is not expected, and lines that may stray slightly from the solution image 112 but still remain within the solution region 114 will nonetheless be considered acceptable. Step 1038 identifies sketched image components that are not part of the solution and are designated as additional image components shown as 118A and 118B in FIG. 9B, and correspond to incorrect image components. For a sketch to be graded as "correct," the completeness of the sketch should also be considered. A factor of completeness of a sketch can be indicated by the missing image components, which are elements of a solution that a student did not draw. Determining missing image components can be done through steps 1002, 1004, 1006, and 1008 in FIG. 13. As previously described, in step 1002, the user generates sketch image 108. From the sketch image 108, a sketch region 110, as shown in FIG. 9C, is generated in step 1004. In step 1006, the solution image 112 is compared to the sketch region 110. Step 1008 identifies solution image components that are not part of the sketch region and designates them as missing image components as depicted by 156A and 156B in FIG. 9C, which correspond to required part(s) of the solution that have not been drawn. With this approach, image components that are part of the solution image 112 but are not in the sketch region 110 are identified as missing image components 116. Referring to FIG. 4B, missing image component 116 correspond to errors in the sketch. Step 1010 identifies the magnitude of the missing image components 116, and step 1040 identifies the magnitude of the additional image components 118. There are a number of ways in which the magnitude of an image component can be quantified as described in '889. Step 1012 in FIG. 8 compares the magnitudes of missing image components to a designated threshold or thresholds. In a similar fashion, step 1042 in FIG. 13 compares the magnitude of the additional image components to a designated threshold or thresholds.

In step 1014 in FIG. 13, the criteria for the sketch passing are evaluated. If both the comparison in step 1012 and step 1042 pass, then the sketch will be graded as correct. On the other hand, if either of these tests is not met, then the sketch can be graded as incorrect and a hint can be generated in step 1050. The hint can be based upon the intermediate values using in the sketch grading such as the magnitude of missing or additional components, but the hint can also be generated from additional analysis such as comparison to predefined sketches with mistakes. Once a hint is generated it can be presented to the students in step 1052. The presentation to the students can be requested by the student or can be presented unsolicited to help the student.

The same sketch of a students can correspond to a number of different hints or mini-hints. For example, the sketch error shown in FIG. 6 can correspond to both a missing line segment and also to a predefined sketch error. In a similar fashion the sketch error shown in FIG. 8 can correspond to both an additional line segment and also to a predefined sketch error. The error in the FIG. 12B can be identified as an error in a dashed line or alternatively identified as an error in the Front View region. In order to provide a desired learning experience for the student, a hint hierarchy table can be generated by the assignment author as show in in FIG. 14.

The first column of the in FIG. 14 is the hint hierarchy. Hints are evaluated in the order of the hierarchy with the lowest number coming first. The second column is the number of times a hint can be displayed to the user, and valid inputs can be a positive integer or infinity. The third column is the hint trigger which is the condition that specifies when that hint can be triggered. The fourth column is the hint message displayed to the user. In the example table shown in FIG. 14, the first criteria evaluated is row 1 which considers the magnitude of the sketch errors to determine if an additional sketch line is a likely cause of the sketch failing, as is the case for the sketch in FIG. 8. If the condition for this hint trigger is not met, then the next highest hint trigger is evaluated. Whenever a hint trigger is met and the feedback displayed to the user, then the remaining number of times that hint can be repeated is reduced by one. However, some hints can repeated an infinite number of times as shown in column 2. The last row on the table should always be infinite number for repeats, so that the user does not run out of hints.

Through use of the hint hierarchy table the same sketch can receive different hint feedback. The assignment author or software can specify the order of the hints and the number of times specific hints can be triggered, along with the conditions that trigger specific hints. The hint hierarchy table describes a mapping between sketch grading results that trigger hints and the hint messages students receive.

The systems and methods described above may be operational with numerous general-purpose or special-purpose computing system environments, configurations, processors and/or microprocessors. Examples of well-known computing systems, environments, and/or configurations that may be suitable for use with the technology disclosed herein include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The system description above may include or define a plurality of components that make up the system, where the components are described as physical implementations of particular functionalities. The portion of system functionality assigned to each of the components is used for convenience only to more easily convey the functionality of the disclosed system to the reader. Thus, unless specifically described as such in association with one or more embodiments of the system, any assignment made above of particular functionalities to particular components is not a necessary feature of the system.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

General Interpretive Principles for the Present Disclosure

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, a system or an apparatus may be implemented, or a method may be practiced using any one or more of the aspects set forth herein. In addition, the scope of the disclosure is intended to cover such a system, apparatus or method which is practiced using other structure, functionality, or structure and functionality in addition to or other than the various aspects of the disclosure set forth herein. It should be understood that any aspect disclosed herein may be set forth in one or more elements of a claim. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

With respect to the use of plural vs. singular terms herein, those having skill in the art can translate from the plural to the singular and/or from the singular to the plural as is appropriate to the context and/or application. The various singular/plural permutations may be expressly set forth herein for sake of clarity.

When describing an absolute value of a characteristic or property of a thing or act described herein, the terms "substantial," "substantially," "essentially," "approximately," and/or other terms or phrases of degree may be used without the specific recitation of a numerical range. When applied to a characteristic or property of a thing or act described herein, these terms refer to a range of the characteristic or property that is consistent with providing a desired function associated with that characteristic or property.

In those cases where a single numerical value is given for a characteristic or property, it is intended to be interpreted as at least covering deviations of that value within one significant digit of the numerical value given.

If a numerical value or range of numerical values is provided to define a characteristic or property of a thing or act described herein, whether or not the value or range is qualified with a term of degree, a specific method of measuring the characteristic or property may be defined herein as well. In the event no specific method of measuring the characteristic or property is defined herein, and there are different generally accepted methods of measurement for the characteristic or property, then the measurement method should be interpreted as the method of measurement that would most likely be adopted by one of ordinary skill in the art given the description and context of the characteristic or property. In the further event there is more than one method of measurement that is equally likely to be adopted by one of ordinary skill in the art to measure the characteristic or property, the value or range of values should be interpreted as being met regardless of which method of measurement is chosen.

It will be understood by those within the art that terms used herein, and especially in the appended claims (e.g., bodies of the appended claims) are intended as "open" terms unless specifically indicated otherwise (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

In those instances where a convention analogous to "at least one of A, B, and C" is used, such a construction would include systems that have A alone, B alone, C alone, A and B together without C, A and C together without B, B and C together without A, as well as A, B, and C together. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include A without B, B without A, as well as A and B together."

Various modifications to the implementations described in this disclosure can be readily apparent to those skilled in the art, and generic principles defined herein can be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A method of providing guidance to a user of a computer implemented educational system, the method comprising:
   receiving user input via a computer sketch input interface, the user input defining a first computer sketch;
   comparing the first computer sketch to a model computer sketch;
   calculating a graphical magnitude of one or more differences and/or similarities between the first computer sketch and the model computer sketch;
   assigning a fail status to the first computer sketch based at least in part on the calculating; and
   in response to the fail status, automatically outputting a guidance element to the user.

2. The method of claim 1, wherein the guidance element comprises a graphic or textual output indicative of a quantitative measure of one or more differences and/or similarities between the first computer sketch and the model computer sketch, wherein the quantitative measure is based at least in part on the calculated graphical magnitude.

3. The method of claim 2, wherein the graphic or textual output does not include information identifying the position of any lines of the model computer sketch.

4. The method of claim 2, wherein the graphic or textual output comprises a quantitative measure of how many lines in the first computer sketch correspond with lines in the model computer sketch.

5. The method of claim 2, wherein the graphic or textual output comprises a quantitative measure of how many lines in the first computer sketch that are omitted with respect to the model computer sketch.

6. The method of claim 2, wherein the graphic or textual output comprises a quantitative measure of how many lines in the model computer sketch are omitted in the first computer sketch.

7. The method of claim 1, wherein the fail status is output to the user with the guidance element in a single display.

8. An interactive education system comprising:
   a computer sketch input interface;
   a sketch generator executing on a processor configured to receive user interaction signals from the computer sketch input interface and generate a computer sketch defined thereby;
   a pass/fail result generator executing on a processor configured to output a pass indication or a fail indication to the user based at least in part on a comparison between the sketch created by user interaction and the model sketch;
   a guidance sketch comparator executing on a processor configured to receive the pass/fail result, and if the result is fail, automatically generate content for a guidance element based at least in part on a comparison between the sketch created by user interaction and the model sketch, wherein the comparison comprises calculating a graphical magnitude of one or more differences and/or similarities between the first computer sketch and the model computer sketch;
   a guidance element generator executing on a processor configured to receive the content for a guidance element from the guidance sketch comparator and automatically output a guidance element to the user containing the content.

9. In an interactive sketch education system, a method of generating guidance elements for outputting to a user of the interactive sketch education system, the method comprising:
   comparing a computer sketch created by a user with a model computer sketch;
   outputting to the user a guidance element based at least in part on the comparing, wherein the guidance element contains information indicating similarities and/or differences between the computer sketch created by the user and the model sketch without containing information indicating the location of any sketch component in the model sketch or in the sketch created by the user, and wherein the information indicating similarities and/or differences between the computer sketch created by the user and the model sketch is based at least in part on a graphical magnitude of one or more differences and/or similarities between the first computer sketch and the model computer sketch.

10. The method of claim 9, wherein the information indicating similarities and/or differences is quantitative information.

11. The method of claim 9 comprising automatically outputting the guidance element to the user without a user request for guidance.

12. An interactive education system comprising:
    a computer sketch input interface;
    a sketch generator configured to receive user interaction signals from the computer sketch input interface and generate a computer sketch defined thereby;
    a pass/fail result generator configured to output a pass indication or a fail indication to the user based at least in part on a comparison between the sketch created by user interaction and a model sketch;
    a database storing information regarding one or more predefined sketch errors that are anticipated to be committed by a user when using the computer sketch input interface to perform a sketching assignment;
a guidance sketch comparator configured to receive the pass/fail result, and if the result is fail, generate content for a guidance element based at least in part on a comparison between one or more components of the sketch created by user interaction and the one or more predefined sketch errors stored in the database;
a guidance element generator configured to receive the content for a guidance element from the guidance sketch comparator and output a guidance element to the user containing the content.

\* \* \* \* \*